(12) United States Patent
Kumar Agrawal et al.

(10) Patent No.: US 11,635,931 B2
(45) Date of Patent: Apr. 25, 2023

(54) METHODS AND ELECTRONIC DEVICES ENABLING A DUAL CONTENT PRESENTATION MODE OF OPERATION

(71) Applicant: Motorola Mobility LLC, Chicago, IL (US)

(72) Inventors: Amit Kumar Agrawal, Bangalore (IN); Caio Luiz Leal Chagas do Nascimento, Campinas (BR); Mahadevan Ayalur, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 260 days.

(21) Appl. No.: 17/308,806

(22) Filed: May 5, 2021

(65) Prior Publication Data
US 2022/0357910 A1 Nov. 10, 2022

(51) Int. Cl.
*G06F 3/14* (2006.01)
*G06F 3/16* (2006.01)
*G06F 21/31* (2013.01)
*G06F 1/16* (2006.01)

(52) U.S. Cl.
CPC .......... *G06F 3/1446* (2013.01); *G06F 1/1647* (2013.01); *G06F 1/1652* (2013.01); *G06F 1/1681* (2013.01); *G06F 3/165* (2013.01); *G06F 21/31* (2013.01)

(58) Field of Classification Search
CPC .... G06F 3/1446; G06F 1/1647; G06F 1/1652; G06F 1/1681; G06F 3/165; G06F 21/31
See application file for complete search history.

(56) References Cited

U.S. PATENT DOCUMENTS

| | | | |
|---|---|---|---|
| 9,807,213 | B2 | 10/2017 | Stewart |
| 10,063,677 | B2 | 8/2018 | Cavallaro et al. |
| 2014/0043259 | A1 | 2/2014 | Park |
| 2017/0034320 | A1 | 2/2017 | Stewart |
| 2017/0272559 | A1 | 9/2017 | Cavallaro |
| 2018/0018753 | A1 | 1/2018 | McLaughlin |

(Continued)

FOREIGN PATENT DOCUMENTS

CN 112602144 4/2021

OTHER PUBLICATIONS

"Galaxy Z Flip", Unknown exact availability date but believed to be prior to filing of present application; Viewed online May 6, 2021 at https://www.samsung.com/us/mobile/galaxy-z-flip/.

(Continued)

*Primary Examiner* — Abbas I Abdulselam
(74) *Attorney, Agent, or Firm* — Philip H. Burrus, IV

(57) ABSTRACT

A method in an electronic device comprises detecting, with one or more sensors, a geometry or geometric form factor defined by an amount a first device housing or first device housing portion of the electronic device is pivoted about a hinge or deformable portion relative to a second device housing or second device housing portion of the electronic device, as well as also detecting, with one or more other sensors, multiple persons within an environment of the electronic device. One or more processors then enable, in response to detecting the geometric form factor and the multiple persons within the environment, a dual content presentation mode of operation allowing presentation of first content on a first display of the electronic device and second content on a second display where the first content and the second content are different.

20 Claims, 13 Drawing Sheets

(56) References Cited

U.S. PATENT DOCUMENTS

2020/0389578 A1   12/2020  Lee
2021/0074242 A1    3/2021  Cho

OTHER PUBLICATIONS

"LG G8X ThingQ", Unknown exact availability date but believed to be prior to filing of present application; viewed online May 6, 2021 at https://www.lg.com/us/cell-phones/lg-lmg850qm7xausabk-unlocked-g8x-thinq-dual-screen#.

"Samsung Galaxy Z Fold2", Unknown exact availability date but believed to be prior to filing of present application; Viewed online May 6, 2021 at https://www.samsung.com/us/smartphones/galaxy-z-fold2-5g/.

Seyedvosoghi, Farid , "Notice of Allowance", U.S. Appl. No. 17/308,810, filed May 5, 2021; dated Aug. 11, 2022.

METHODS AND ELECTRONIC DEVICES ENABLING A DUAL CONTENT PRESENTATION MODE OF OPERATION

BACKGROUND

Technical Field

This disclosure relates generally to electronic devices, and more particularly to electronic devices having user interfaces operable to present content.

Background Art

The feature sets included with modern portable electronic devices, such as smartphones, tablet computers, smart watches, and other devices, are increasingly becoming richer and more sophisticated. Illustrating by example, while mobile phones were once equipped with simplistic backlit displays having only large grey scale pixels, modern smartphones frequently include high definition organic light emitting diode displays with incredibly small pixels and extremely high contrast ratios capable of presenting high dynamic range images and videos. Many consumers today eschew television sets, instead consuming entire television shows, and even feature length movies, using only a smartphone.

In some situations, only one device will be available despite the fact that multiple users each want to use the device to consume content. It would be advantageous to have improved electronic devices and corresponding systems and methods enabling such users to satisfy their content consumption desire in such situations.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
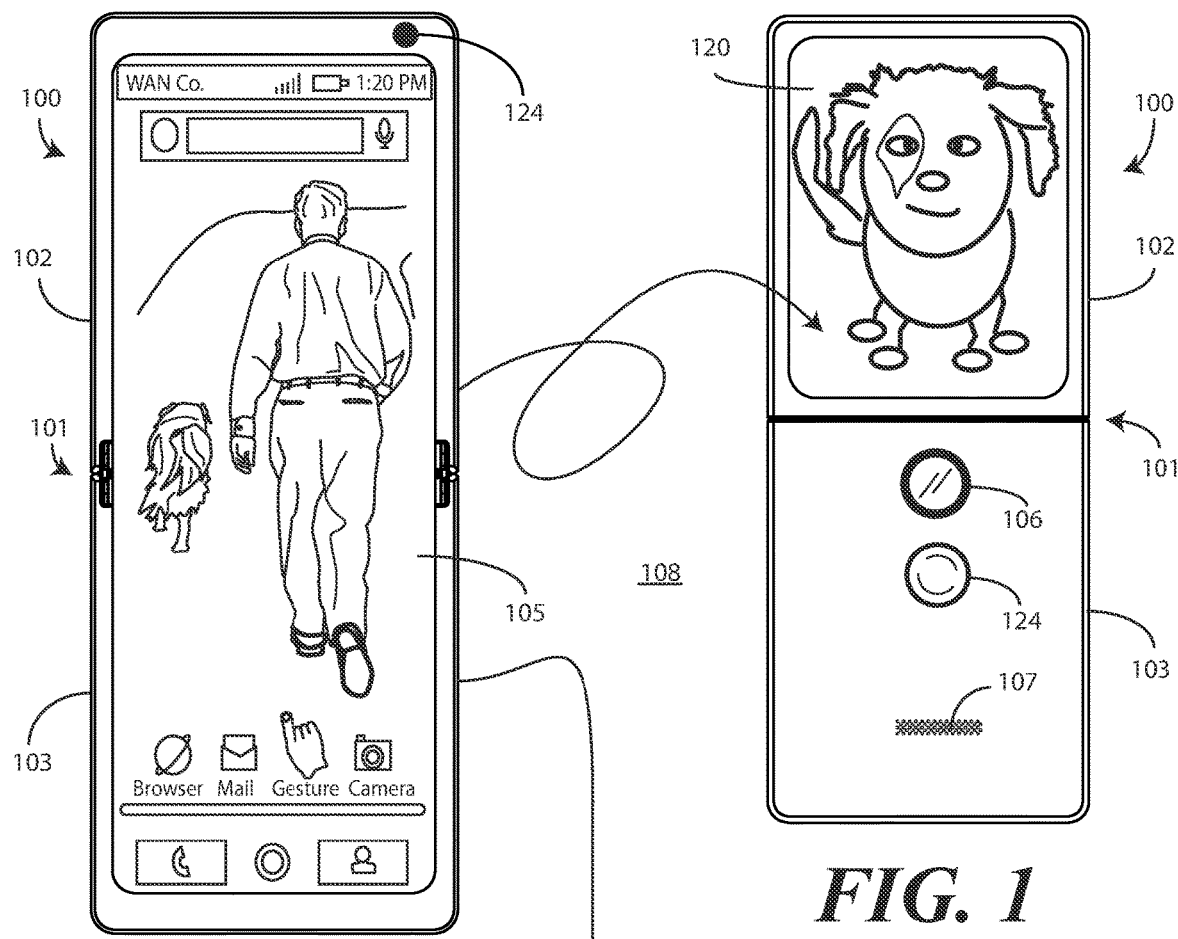
FIG. 1 illustrates one explanatory electronic device configured in accordance with one or more embodiments of the disclosure.
Figure 1:
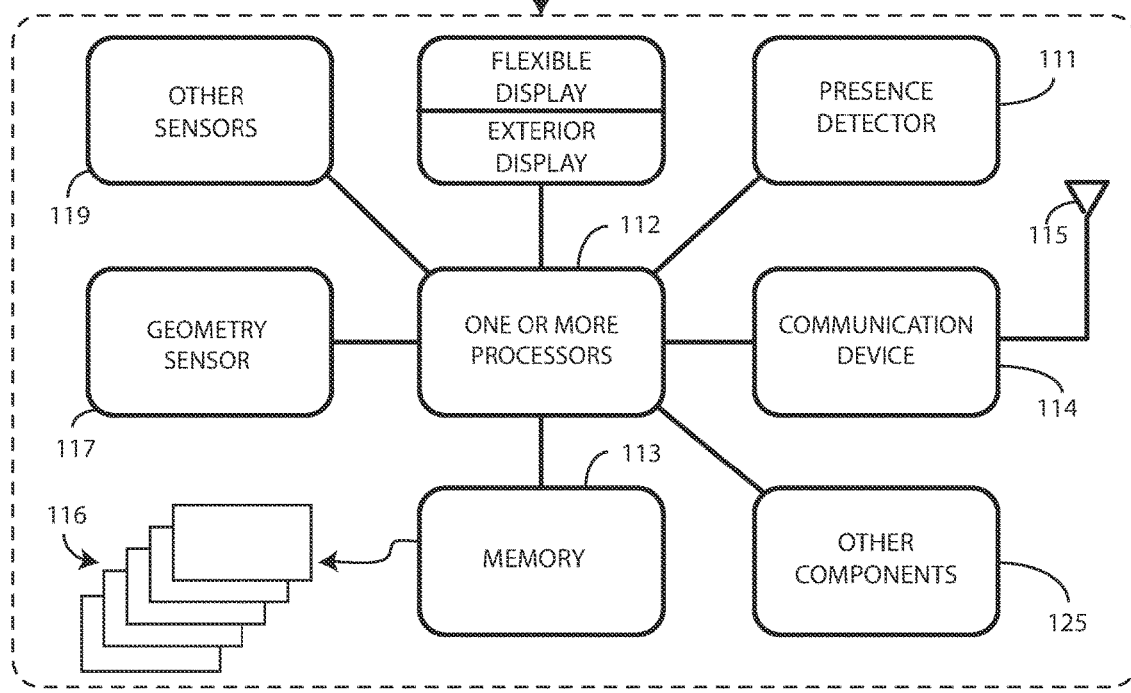

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to enabling, in response to detecting a geometric form factor of an electronic device, a dual content presentation mode of operation allowing a single electronic device to present two different content offerings to two different users. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of enabling dual content presentation modes of operation as described herein. The non-processor circuits may include, but are not limited to, a radio receiver, a radio transmitter, signal drivers, clock circuits, power source circuits, and user input devices. As such, these functions may be interpreted as steps of a method to perform enablement of the dual content presentation mode of operation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that is geometrically deformable. In one or more embodiments, the electronic device includes a first device housing that is pivotable about a hinge relative to a second device housing between a closed position and an axially displaced open position. In one or more embodiments, the hinge is configured as a "friction hinge" that allows a user to pivot the first device housing relative to the second device housing to any position between the closed position and the axially displaced open position with that device geometry being retained by a frictional element situated in the hinge. In other embodiments, the electronic device will include a deformable housing allowing a user to move a first device housing portion relative to a second device housing portion to various positions between the closed position and the axially displaced open position.

In some embodiments, this ability to deform the electronic device and manipulate it between the closed position and the axially displaced open position allows for the inclusion of a second display, which is sometimes known as a "quick view display" or "qvd" due to the fact that it is always exposed regardless of whether the electronic device is in the axially displaced open position or the closed position. By contrast, in some embodiments the primary display is concealed when the electronic device is in the closed position and revealed as the electronic device transitions from the closed position to the axially displaced open position.

Inclusion of the second display allows users of the electronic device to get information at a quick glance when the electronic device is in the closed position without having to transition the electronic device from the closed position to the axially displaced open position. Another advantage offered by this provision of the second display is that in one or more embodiments it provides a substantial amount of area upon which to present content such as images or videos.

When an electronic device is equipped with the second display and the friction hinge, the electronic device can be positioned into different geometric form factors that most easily allow for content consumption. Illustrating by example, a user may pivot the first device housing about the hinge relative to the second device housing to a geometric form factor in which the first device housing is oriented substantially orthogonally relative to the second device housing. This "half open" geometric form factor allows a first user to see the primary display, while a second user can see the second display.

In addition to allowing multiple users to see multiple displays, the user may have many different motivations for transitioning the electronic device into a predefined geometric form factor. For instance, the user may want a particular geometric form factor such that the display "sits up" for a particular situation. If, for example, the person is reading a recipe being presented on the primary display, they may not want the electronic device to be in the axially displaced open position as the viewing angle would not be optimal. By placing the electronic device in the half open position, the recipe may be more easily seen.

Similarly, a user may want to transition the electronic device to a geometric form factor so that the electronic device can perform a specific function. If, for example, the user wants an exterior imager to take a group photograph, they may want to device housing portion carrying the imager to be positioned upward relative to a support surface so that the group is within the field of view of the imager.

In still other embodiments, a user may want to transition the electronic device to an easily viewable position for passive interaction with the electronic device. Embodiments of the disclosure contemplate that the electronic device may use the second display to present a clock or other passive content presentation when in a standby mode. A user may transition the device to a geometric form factor allowing the clock face to be quickly seen from a bed, for instance.

In some situations, only one device will be available despite the fact that multiple users each want to use the device to consume content. Embodiments of the disclosure contemplate that these multiple users may wish to bond with each other by interacting in a joint experience. However, they may want to consume different content offerings. A parent may prefer to learn a new skill by watching a woodworking tutorial while a child may want to catch up on the latest sitcom, for instance.

Embodiments of the disclosure provide a solution to this issue by enabling, in response to detecting a particular geometric form factor, a dual content presentation mode of operation allowing presentation of a first content offering on a first display of an electronic device and a second content offering on a second display, where that first content offering and the second content offering are different. If the electronic device has only one display that is flexible, embodiments of the disclosure allow for the presentation of first content on a first display portion of the flexible display situated to one side of a deformable portion of a device housing and second content on a second display portion of the flexible display situated to another side of the deformable portion, where the first content and the second content are different.

Illustrating by example, in one embodiment a first user may want to consume only visual content on the primary display of an electronic device while a second user also wants to consume only visual content on the second display. Examples of such visual content include email, messages, pictures, social media feeds, and webpages. In other situations, the first user may want to consume only visual content on the primary display, while the second user wants to consume audio-visual content on the second display. Examples of audio-visual content include videos (either streaming or recorded), social network videos, webpage videos, movies, and television shows. In still other situations, both users will want to consume audio-visual content.

Embodiments of the disclosure allow for the presentation of the requested content for each of these situations by enabling the dual content presentation mode of operation where first content is presented on a first display or a first display portion while second content is presented on a second display or second display portion. Where the first content and the second content is only visual content, they are simply presented due to the fact that there is no audio associated with the visual content. Where the first content is only visual content and the second content is audio visual content, or vice versa, the audio associated with the audio-visual content can simply be delivered to the environment (since one user has no need to hear video) or to a specific audio channel such as an ear bud or headphones to avoid irritating the user consuming the visual only content. Where the first content and second content are both audio-visual content offerings, the audio can be routed to either the environment and an alternate audio channel, e.g., an ear bud or headphones, or to two different audio channels, e.g., two sets of headphones or two sets of ear buds.

Embodiments of the disclosure also contemplate that an electronic device can be coupled to a docking station that may support the electronic device in a particular orientation. Illustrating by example, in one or more embodiments the electronic device can be coupled to a docking station while in the axially displaced open position such that the electronic device stands straight up in the air. This upwardly supported position allows a person situated to one side of the electronic device to see one of the displays, while another person situated to the other side of the electronic device can see the other display. In one or more embodiments, when this situation occurs, one or more processors of the electronic device can enable, in response to detecting multiple persons within the environment of the electronic device while the electronic device is in the axially displaced open position and is coupled to the docking station, a dual content presentation mode of operation allowing presentation of first content on a first display of the electronic device and second content on a second display where the first content and the second content are different.

In one or more embodiments when the electronic device comprises a hinge and second display, a method in an electronic device includes detecting, with one or more sensors, a geometric form factor defined by an amount a first device housing of the electronic device is pivoted about a hinge relative to a second device housing of the electronic device. The method includes also detecting, with one or more other sensors, multiple persons within an environment of the electronic device. In one or more embodiments, the method includes enabling, with one or more processors in response to detecting the geometric form factor and the multiple persons within the environment, a dual content presentation mode of operation allowing presentation of first content on a first display of the electronic device and second content on a second display where the first content and the second content are different.

In one or more embodiments when the electronic device includes only a single flexible display, and either a hinge or a deformable device housing, a method comprises detecting, with one or more sensors, a geometry of the deformable electronic device. In one or more embodiments, the geometry is defined by an obtuse angle defined between a first device housing portion of the deformable electronic device relative to a second device housing portion of the deformable electronic device. The method includes also detecting, with one or more other sensors, multiple persons within an environment of the deformable electronic device, and enabling, with one or more processors in response to detecting the geometry and the multiple persons within the environment, a dual content presentation mode of operation allowing presentation of first content on a first display portion of the flexible display situated to one side of the deformable portion and second content on a second display portion of the flexible display situated to another side of the deformable portion, where the first content and the second content are different.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, a partially open position, shown and described below with reference to FIG. 3, and an open position, shown and described below with reference to FIG. 4.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, as will be described below with reference to FIGS. 15-19, electronic devices configured in accordance with embodiments of the disclosure will not include a hinge 101. Illustrating by example, the electronic device 100 may include a flexible device housing, or the first device housing and second device housing can each comprise flexible device housings. A single device housing, for instance, can be manufactured from bendable materials. In still other embodiments, the electronic device 100 can be bendable via a combination of hinge components and non-hinge components.

Accordingly, in another embodiment the electronic device 100 of FIG. 1 includes a single housing. In one or more embodiments, that housing is flexible. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

The illustrative electronic device 100 of FIG. 1 includes multiple displays. A first display 105, also referred to as the interior display or the rear-facing display, is concealed when the first device housing 102 is pivoted about the hinge 101 relative to the second device housing 103 to a closed position. For example, the first display 105 is concealed in FIG. 2 below. This first display 105 is then revealed when the first device housing 102 is pivoted about the hinge 101 relative to the second device housing 103 from the closed position to an axially displaced open position. Thus, the first display 105 is revealed as the electronic device 100 transitions from the closed position of FIG. 2 to the open position of FIG. 4.

In one or more embodiments, the electronic device 100 also includes at least a second display 120. In the illustrative embodiment of FIG. 1, the second display 120 can be referred to as an exterior display, quick view display, or front-facing display, as the second display 120 is exposed both when the first device housing 102 and the second device housing 103 are pivoted about the hinge 101 to the closed position, the axially displaced open position, or any position therebetween. Thus, the second display 120 is exposed both in the axially displaced open position of FIG. 1 and the closed position of FIG. 2. In one or more embodiments, each of the first display 105 and the second display 120 is a high-resolution display.

While shown coupled to the first device housing 102, it should be noted that the second display 120 could be coupled to either of the first device housing 102 or the second device housing 103. In other embodiments, the second display 120 can be coupled to the first device housing 102, while a third display (not shown) is coupled to the second device housing 103. Thus, electronic devices configured in accordance with embodiments of the disclosure can include displays situated at different positions.

As with the second display 120, the first display 105 can also be coupled to either or both of the first device housing 102 or the second device housing 103. In this illustrative embodiment, the first display 105 is coupled to both the first device housing 102 and the second device housing 103 and spans the hinge 101. In other embodiments, the "first" display can be two displays, with one coupled to the first device housing 102 and another coupled to the second device housing 103. In either case, this first display 105 is considered to be an "interior" display because it is concealed when the first device housing 102 and the second device housing 103 are in the closed position.

In one or more embodiments, either or both of first display 105 or second display 120 can be touch-sensitive. Where this is the case, users can deliver user input to one or both of the first display 105 or the second display 120 by delivering touch input from a finger, stylus, or other objects disposed proximately with the first display 105 or the second display 120.

In the illustrative embodiment of FIG. 1, since the first display 105 spans the hinge 101, it is configured to be flexible. For instance, in one embodiment the first display 105 is configured as an organic light emitting diode (OLED) display fabricated on a flexible plastic substrate. This allows the first display 105 to be flexible so as to deform when the first device housing 102 pivots about the hinge 101 relative to the second device housing 103. However, it should be noted that other types of displays would be obvious to those of ordinary skill in the art having the benefit of this disclosure. As will be described below with reference to FIG. 6, in other embodiments conventional, rigid displays can be disposed to either side of the hinge rather than using a flexible display.

In one or more embodiments, the first display 105 is configured as an OLED constructed on flexible plastic substrates to allow the first display 105 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the first display 105 may be formed from multiple layers of flexible material such as flexible sheets of polymer or other materials.

In this illustrative embodiment, the first display 105 is coupled to the first device housing 102 and the second device housing 103. Accordingly, the first display 105 spans the hinge 101 in this embodiment. In one or more embodiments, the first display 105 can instead be coupled to one, or two, spring-loaded, slidable trays that situate within one or both of the first device housing 102 and the second device housing 103. The use of one or two slidable trays advantageously allows the first display 105 to be placed in tension when the electronic device 100 is in the open position. This causes the first display 105 to be flat, rather than wavy due to mechanical memory effects, when the electronic device 100 is in the open position.

Features can be incorporated into the first device housing 102 and/or the second device housing 103. Examples of such features include imager 106, which in this embodiment is an exterior or front facing imager. The imager 106, which can be any number of types of image capture devices, has its lens situated such that it is directed away from a user who is holding the electronic device 100 and facing the first display 105. This allows the imager 106 to receive light directed toward the electronic device 100 from a location in front of the user when the user is holding the electronic device 100 and facing the first display 105.

Instead of, or alternatively in addition to, the imager 106, a second, rear facing imager 121 can be positioned on the interior side of the electronic device 100 to receive light and images directed toward the first display 105. When a user is holding the electronic device 100 and looking at the first display, this second, rear facing imager 121 can be used to take a selfie without turning the electronic device 100 around. While two imagers are shown in the illustrative embodiment of FIG. 1, it should be noted that embodiments of the disclosure can include additional imagers mounted in different positions that can be actuated to capture images from different angles.

Other examples of features that can be incorporated into the first device housing 102 and/or the second device housing 103 include an optional speaker port 107. While shown situated on the exterior of the electronic device 100 in FIG. 1, the optional speaker port 107 could also be placed on the interior side as well. In this illustrative embodiment, a user interface component 124, which may be a button or touch sensitive surface, can also be disposed along the exterior side of the second device housing 103. As noted, any of these features shown being disposed on the exterior side of the electronic device 100 could be located elsewhere, such as on the interior side or minor sides in other embodiments.

A block diagram schematic of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In one or more embodiments, the electronic device 100 also includes a presence detector 111 operable to detect whether one or more persons are within an environment 108 of the electronic device 100. Illustrating by example, in one or more embodiments the presence detector 111 can detect actuation of the imager 106 and/or second imager 121 and/or image capture operations. The presence detector 111 can also include a facial recognition module that analyzes images captured by the imager 106 and/or second imager 121 to identify facial characteristics present in images captured by the imager 106 and/or second imager 121. In one or more embodiments, in response to the presence detector 111 identifying these or other image capture operations, the one or more processors can determine whether one or more persons are situated within the environment 108 of the electronic device 100, as well as where these one or more processors are located relative to the electronic device 100.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present content offerings including images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the electronic device 100 includes one or more geometry sensors 117, operable with the one or more processors 112, to detect a particular geometry, geometric form factor, or deformation state of the electronic device 100. Illustrating by example, in one or more embodiments the one or more geometry sensors 117 can detect a bending operation that causes the first device housing 102 to pivot about the hinge 101 relative to the second device housing 103, thereby transforming the electronic device 100 into a deformed geometry, such as that shown in FIGS. 2-3. The inclusion of the one or more geometry sensors 117 is optional, and in some embodiment geometry sensors 117 will not be included.

In one embodiment, the geometry sensors 117 comprise passive resistive devices manufactured from a material with an impedance that changes when the material is bent, deformed, or flexed. By detecting changes in the impedance as a function of resistance, the one or more processors 112 can use the one or more geometry sensors 117 to detect bending of the first device housing 102 about the hinge 101 relative to the second device housing 103. In one or more embodiments, each geometry sensor 117 comprises a bi-directional flex sensor that can detect flexing or bending in two directions. In one embodiment, the one or more geometry sensors 117 have an impedance that increases in an amount that is proportional with the amount it is deformed or bent. Other types of geometry sensors 117 will be obvious to those of ordinary skill in the art having the benefit of this disclosure.

In one embodiment, the one or more processors 112 may generate commands or execute control operations based on information received from the various sensors, including the one or more geometry sensors 117, the presence detector 111, or other sensors 119. Illustrating by example, in one or more embodiments the one or more processors 112 enable a dual content presentation mode of operation in response to the one or more geometry sensors 117 detecting a predefined geometric form factor of the electronic device 100 and the presence detector 111 detecting multiple persons within the environment 108 of the electronic device 100. In one or more embodiments, the dual content presentation mode of operation allows for the presentation of a first content offering on display 105 and a second content offering on display 120. In one or more embodiments, the first content offering and the second content offering are different.

The one or more processors 112 may also generate commands or execute control operations based upon information received from a combination of the one or more geometry sensors 117, the presence detector 111, or the other sensors 119. Alternatively, the one or more processors 112 can generate commands or execute control operations based upon information received from the one or more geometry sensors 117 or the presence detector 111 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, a light sensor, and one or more switches. Touch sensors may used to indicate whether any of the user actuation targets present on the display 105 or display 120 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 125 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
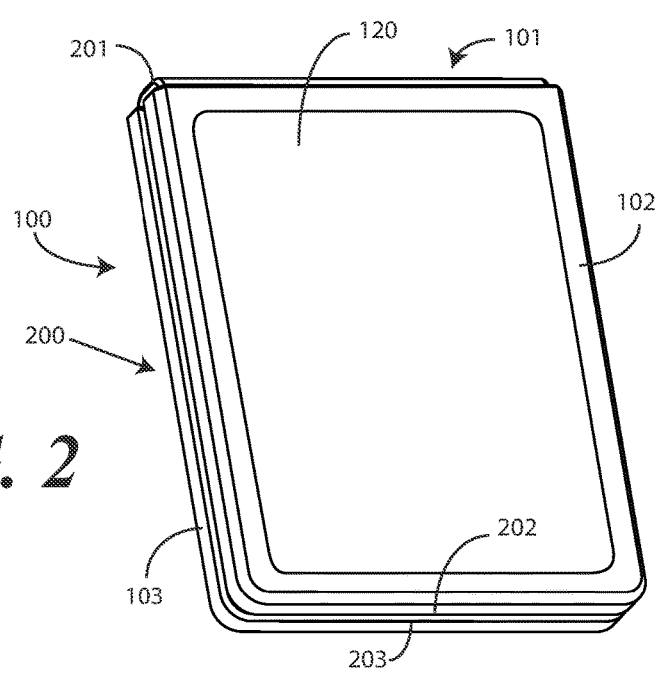
FIG. 2 illustrates a perspective view of one explanatory electronic device in accordance with one or more embodiments of the disclosure in a closed position.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the clam, thereby giving rise to the "clamshell" style of device. When the clamshell opens, the flexible display (105) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 200 will be obvious to those of ordinary skill in the art having the benefit of this disclosure. As shown, the exterior display 120 is visible and exposed when the electronic device is in the closed position 200.

Figure 3:
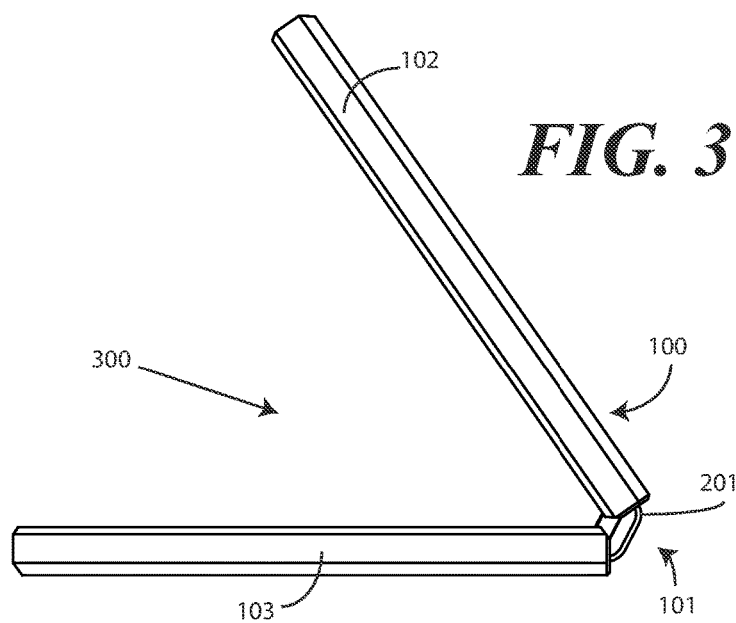
FIG. 3 illustrates a side elevation view of one explanatory electronic device in accordance with one or more embodiments of the disclosure in a partially open position.

Turning now to FIG. 3, the electronic device 100 is shown in a geometric form factor defined by a deformed geometry such that the first device housing 102 and the second device housing 103 are between the closed position (200) of FIG. 2 and an axially displaced open position. Where the hinge 101 includes frictional elements, the electronic device 100 may remain in this geometric form factor until a user pivots one of the first device housing 102 or the second device housing 103 about the hinge 101 to another geometric form factor.

The geometric form factor of FIG. 3 is that of a partially open position 300. Specifically, the first device housing 102 is pivoting about the hinge 101 away from the second device housing 103 toward an open position. The open position 300 shown in FIG. 3 can be referred to as a "tent position." In the side elevation view of FIG. 3, the hinge housing 201 is exposed between the first device housing 102 and the second device housing 103.

Figure 4:
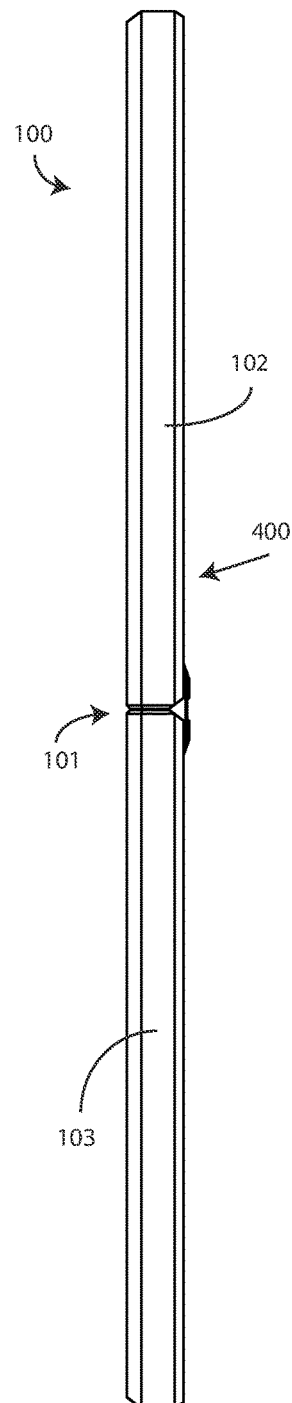
FIG. 4 illustrates a side elevation view of one explanatory electronic device in accordance with one or more embodiments of the disclosure in an axially displaced open position.

Turning now to FIG. 4, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the flexible display (105). In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 105, the flexible display 120 has been elongated into a flat position.

Figure 5:
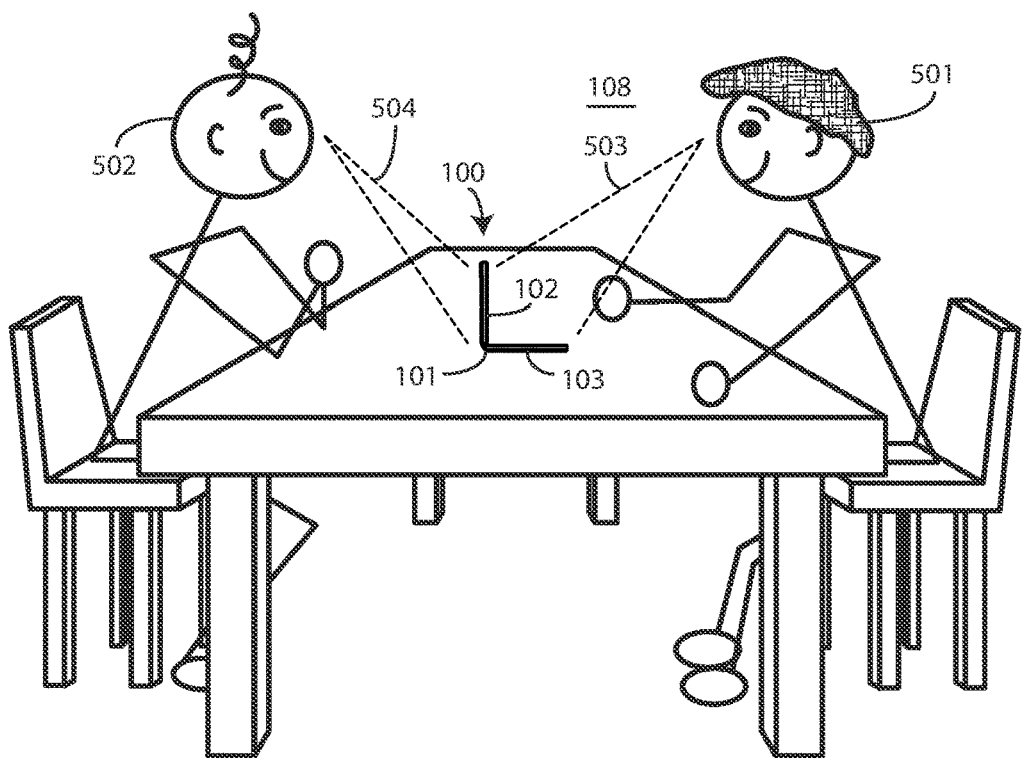
FIG. 5 illustrates one explanatory electronic device operating in a dual content presentation mode of operation in accordance with one or more embodiments of the disclosure.

Turning now to FIG. 5, illustrated therein is the electronic device 100 of FIGS. 1-4 operating in a dual content presentation mode of operation. This allows a first person 501 and a second person 502 to use a single device to consume two different content offerings, e.g., two different television shows, using—and controlling—the first display (105) and the second display (120) dependently.

As previously explained, a first device housing 102 is coupled to a second device housing 103 by a hinge 101 such that the first device housing 102 is pivotable about the hinge relative to the second device housing 103 between a closed position (200) and an axially displaced open position (400). One or more geometry sensors (117) are operable to determine a geometric form factor of the electronic device 100 defined by how far the first device housing 102 is pivoted about the hinge 101 relative to the second device housing 103.

As before, a first display (105) is coupled to the first device housing 102 and second device housing 103, spanning the hinge, while a second display (120) is coupled to the first device housing 102. Additionally, a presence detector (111) is operable to determine whether one or more persons are within an environment 108 of the electronic device 100. In the illustrative example of FIG. 5, the presence detector (111) detects that both a first person 501 and a second person 502 are within the environment 108 of the electronic device 100. Additionally, the presence detector (111) detects the first person 501 being positioned so as to be able to view the first display (105) and the second person 502 being positioned so as to be able to view the second display (120).

In one or more embodiments, the one or more processors (112) within the electronic device 100 are operable with the one or more geometry sensors (117), the presence detector (111), the first display (105) and the second display (120). The one or more processors (112) enable a dual content presentation mode of operation allowing the presentation of a first content offering 503 on the first display (105) and a second content offering 504 on the second display (120) when the one or more geometry sensors (117) detect a predefined geometric form factor.

Figure 6:
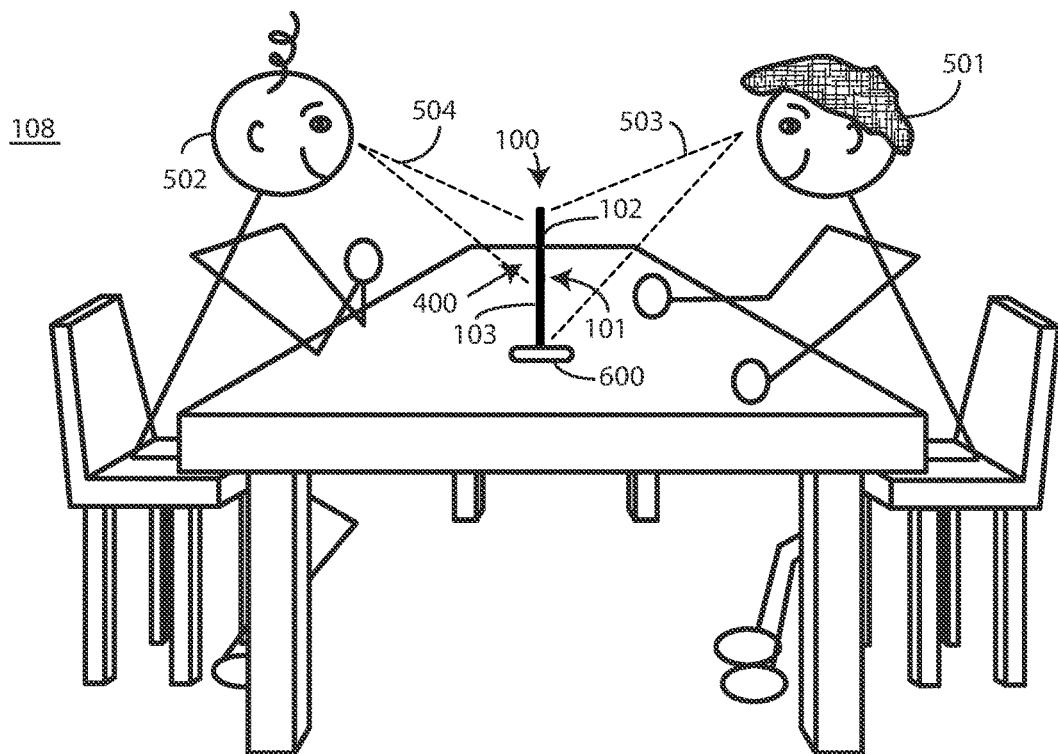
FIG. 6 illustrates one explanatory electronic device operating in a dual content presentation mode of operation when in an axially displaced open position and docked in accordance with one or more embodiments of the disclosure.

In one or more embodiments, the geometric form factor enabling the dual content presentation mode of operation comprises the first device housing 102 being pivoted about the hinge 101 relative to the second device housing 103 to an angle of between seventy-five and one hundred and five degrees, inclusive. In the illustrative embodiment of FIG. 5, the geometric form factor comprises the first device housing 102 being pivoted about the hinge 101 relative to the second device housing 103 to a substantially orthogonal angle. This allows the first person 501 to easily see the first content offering 503 on the first display (105), while the second person 502 can easily see the second content offering 504 on the second display (120). While a geometric form factor of between seventy-five and one hundred and five degrees, inclusive, is one predefined geometric form factor enabling the dual content presentation mode of operation, embodiments of the disclosure are not so limited. Turning now to FIG. 6, illustrated therein is another predefined geometric form factor that enables the dual content presentation mode of operation as well.

As shown in FIG. 6, the electronic device 100 has been moved to the axially displaced open position 400. Additionally, the electronic device 100 is coupled to a docking station 600 such that the first device housing 102 and second device housing 103 extend upwardly from the docking station 600 against the direction of gravity. This predefined geometric form factor also allows the first person 501 to easily see the first content offering 503 on the first display (105), while the second person 502 can easily see the second content offering 504 on the second display (120).

In one or more embodiments, the one or more geometry sensors (117) detects the first device housing 102 of the electronic device 100 being positioned in the axially displaced open position 400 relative to the second device housing 103 coupled to the first device housing 102 by the hinge 101. One or more other sensors (119), e.g., a gravity detector, an electrical connector, or a mechanical sensor, detects the electronic device 100 being electronically coupled to the docking station 600. The presence detector (111) then detects multiple persons, e.g., the first person 501 and the second person 502), being within the environment 108 of the electronic device 100 while the electronic device 100 is in the axially displaced open position 400 and coupled to the docking station 600.

In one or more embodiments, the one or more processors (112) of the electronic device enable, in response to detecting the multiple persons within the environment 108 of the electronic device 100 while the electronic device 100 is in the axially displaced open position 400 and coupled to the docking station 600, a dual content presentation mode of operation allowing presentation of the first content offering 503 on the first display (105) and the second content offering 504 on the second device housing (103). In this illustrative offering, the first content offering 503 and the second content offering 504 are different. Illustrating by example, the first content offering 503 might be a video while the second content offering 504 is a webpage, and so forth.

Figure 7:
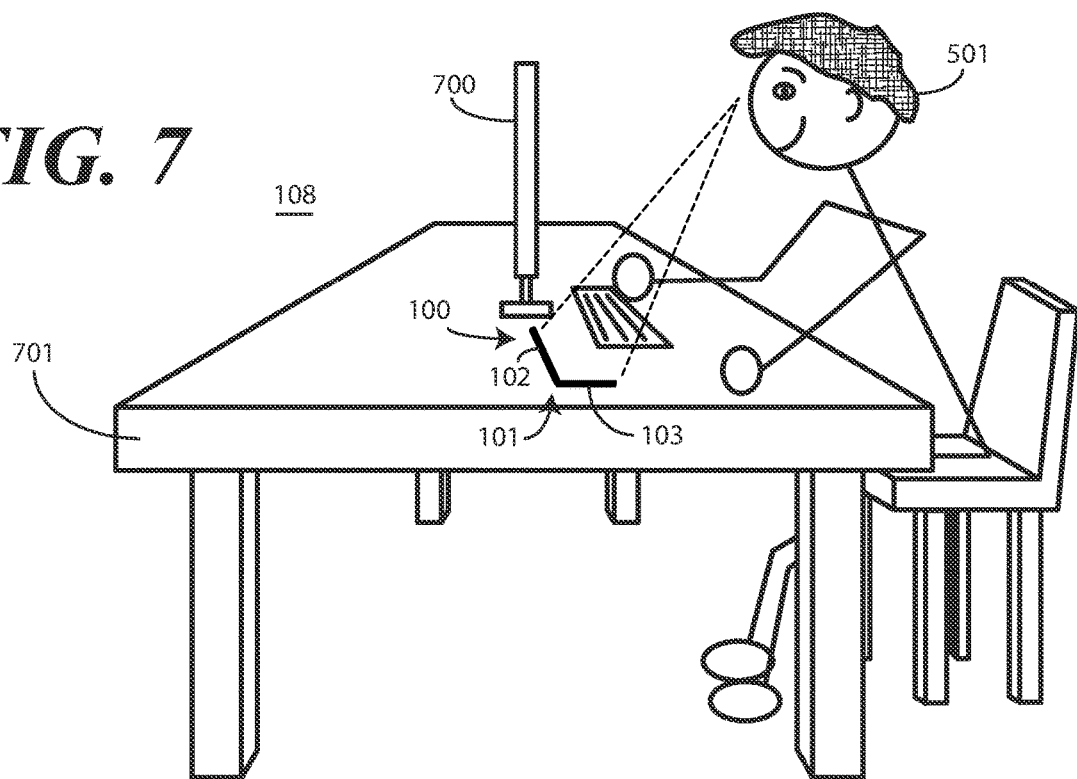
FIG. 7 illustrates one explanatory electronic device operating in a kickstand content presentation mode of operation in accordance with one or more embodiments of the disclosure.

In addition to the dual content presentation mode of operation, embodiments of the disclosure contemplate that other modes of operation can be enabled by positioning the electronic device 100 in other geometric form factors when only one person is within the environment 108 of the electronic device 100. For instance, in addition to allowing multiple users to see multiple displays, a single user may have many different motivations for transitioning the electronic device into a predefined geometric form factor. Turning now to FIG. 7, illustrated therein is one such example.

As shown in FIG. 7, the electronic device 100 has been transitioned to a geometric form factor where the first device housing 102 is pivoted about the hinge 101 relative to the second device housing 103 such that the first device housing 102 and the second device housing define an obtuse angle. This geometric form factor is sometimes referred to as a "kickstand" configuration because it appears to the person 501 viewing the display (105) coupled to the first device housing 102 and the second device housing 103 and spanning the hinge as if the exterior surface of the first device housing 102 is being propped up by a kickstand. In the illustrative embodiment of FIG. 7, this is an optical illusion as the frictional components of the hinge 101 retain the first device housing 102 and second device housing 103 in this obtuse angled geometric form factor.

This geometric form factor allows for the interior display, i.e., display (105), to "sit up" for a particular situation. If, for example, the person 501 is reading notes from the display (105) while writing a term paper on the computer 700, they may not want the electronic device 100 to be in the axially displaced open position (400) while placed on the table 701, as the viewing angle would not be optimal. By placing the electronic device 100 in the geometric form factor of FIG. 7, the notes may be more easily seen.

Figure 8:
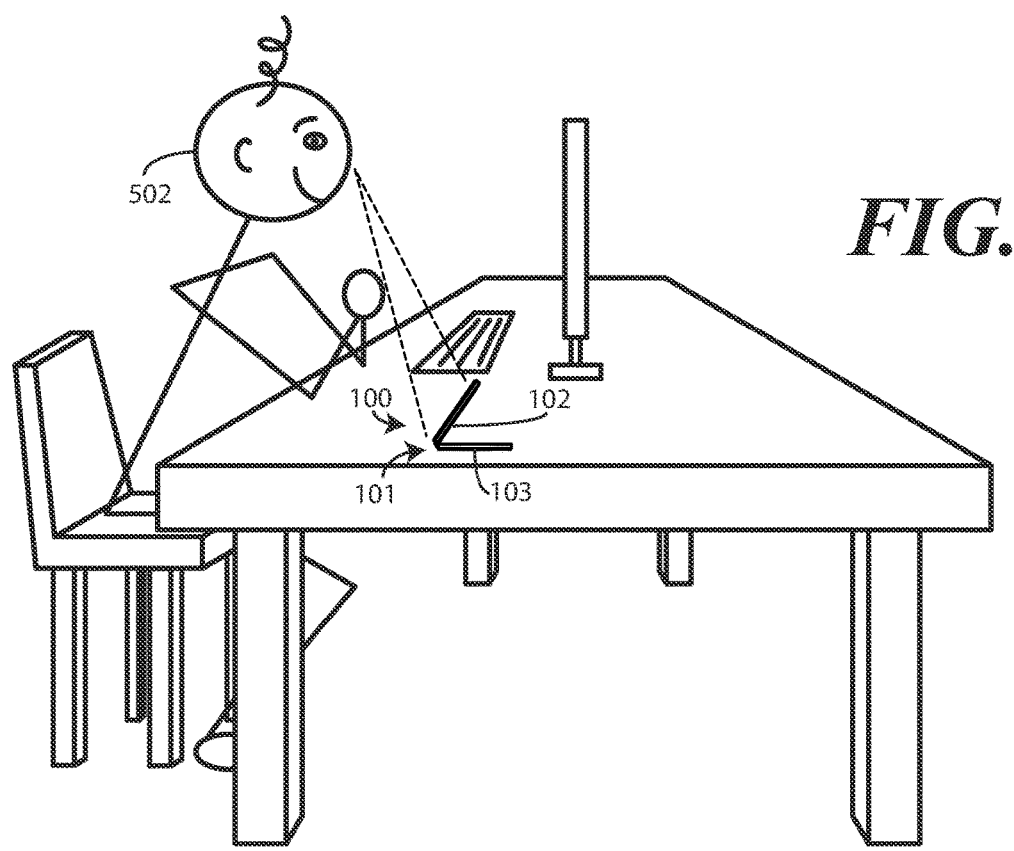
FIG. 8 illustrates one explanatory electronic device operating in a standby mode of operation in accordance with one or more embodiments of the disclosure.

In still other embodiments, a user may want to transition the electronic device 100 to an easily viewable position for passive interaction with the electronic device 100. Turning now to FIG. 8, illustrated therein is one such example Embodiments of the disclosure contemplate that the electronic device 100 may use the second display (120) to present a clock or other passive content presentation when operating in a standby mode. A person 502 may transition the electronic device 100 to a geometric form factor allowing the clock face on the second device housing (103) to be quickly seen. In the illustrative embodiment of FIG. 8, transitioning the first device housing 102 and second device housing 103 such that they define an acute angle enables this passive mode of operation in one or more embodiments.

Accordingly, electronic devices configured in accordance with embodiments of the disclosure can enable a dual content presentation mode of operation when a predefined geometric form factor is detected when multiple persons are also detected within an environment of the electronic device, as described above with reference to FIGS. 5-6. Additionally, electronic device configured in accordance with embodiments of the disclosure can enable other predefined modes of operation when a single person is within the environment of the electronic device, as described above with reference to FIGS. 7-8. When only one person is in the environment, it matters not whether the content offering being presented is visual only, or is instead audio-visual content. This is true because there is only one person within the environment. If the content offering being presented as a function of the detection of the single person and the predefined geometric form factor is visual only, no audio is associated with the content offering. However, if the content offering being presented as a function of the detection of the single person and the predefined geometric form factor is audio-visual content, the corresponding audio can be delivered via an output component, e.g., a loudspeaker to the environment, a speaker jack to an earpiece or headphone device for playback directly to the user's ears, or to a wireless connection to a companion device such as loudspeakers or ear buds, without interfering with any other person.

Figure 9:
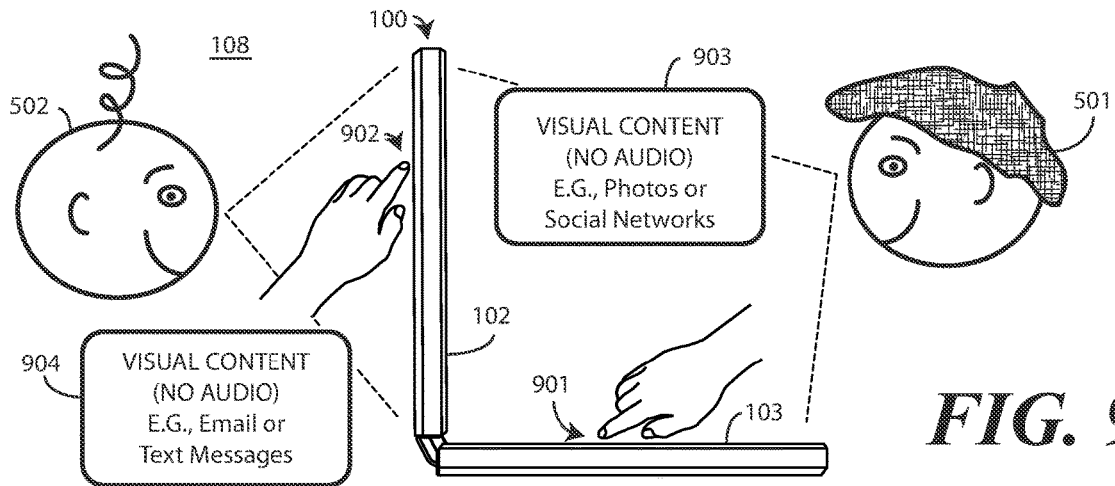
FIG. 9 illustrates one explanatory electronic device operating in a dual content presentation mode of operation in accordance with one or more embodiments of the disclosure.
Figure 10:
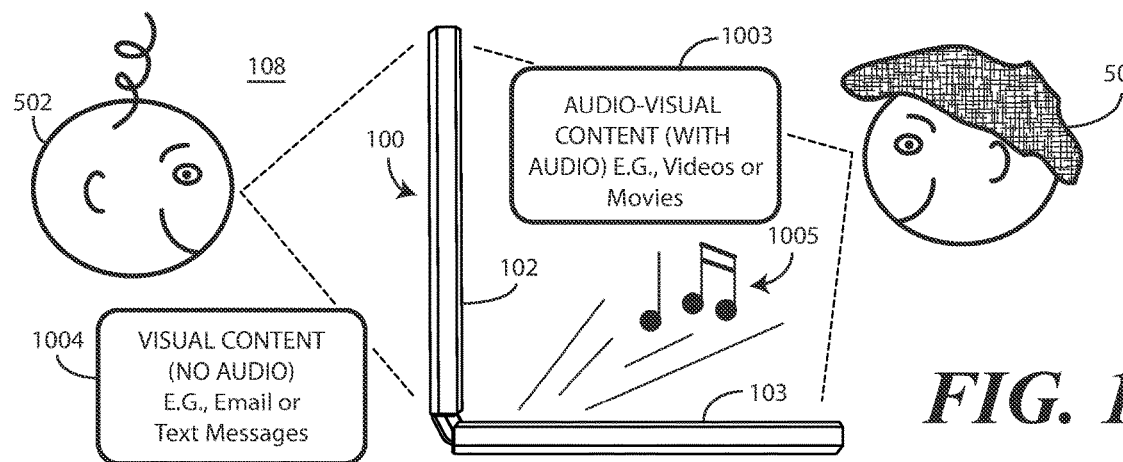
FIG. 10 illustrates another explanatory electronic device operating in a dual content presentation mode of operation in accordance with one or more embodiments of the disclosure.
Figure 11:
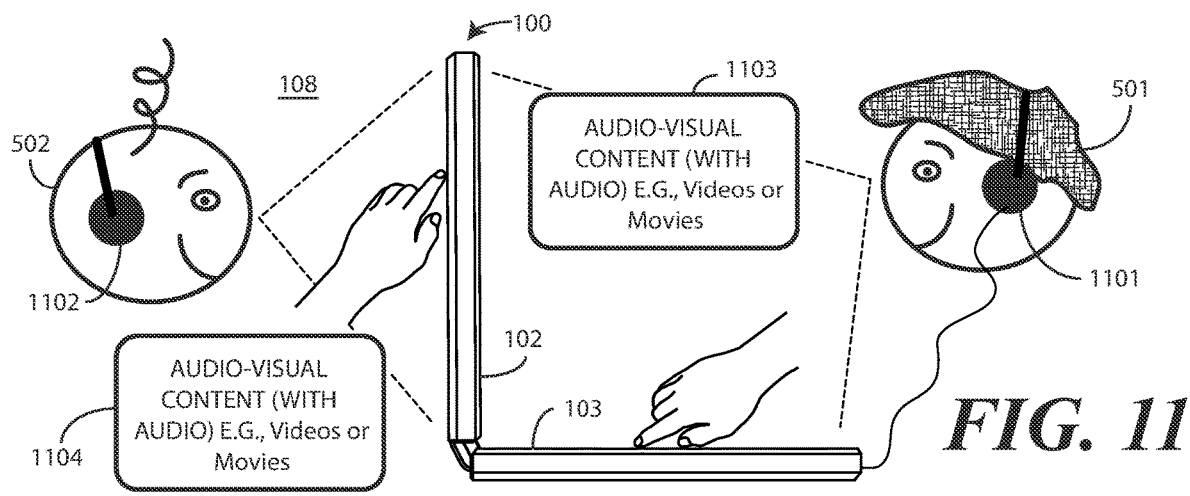
FIG. 11 illustrates yet another explanatory electronic device operating in a dual content presentation mode of operation in accordance with one or more embodiments of the disclosure.

However, when two people are within the environment, and particularly where two people are consuming different content offerings being presented by a first display and a second display of a single device, whether the content offerings are visual only or audio-visual can make a difference to each person's enjoyment of their selected content. This is true because delivering, for example, the audio associated with two different content offerings via a single loudspeaker into the environment could result in neither audio stream sounding irritating or, worse, unintelligible. Advantageously, embodiments of the disclosure provide solutions to these conflicting possibilities. Turning now to FIGS. 9-11, illustrated therein are some examples regarding how this can occur.

Beginning with FIG. 9, and prior to discussing audio handling procedures, it should be noted that in addition to enabling the dual content presentation mode of operation, the one or more processors (112) of the electronic device 100 can enable other features as well in response to the one or more geometry sensors (117) detecting a predefined geometric form factor when the presence detector (111) detects multiple persons within the environment 108 of the electronic device 100.

Illustrating by example, in one or more embodiments the one or more processors (112) also enable, in response to the one or more geometry sensors (117) detecting the predefined geometric form factor and the presence detector (111) detecting the multiple persons within the environment of the electronic device 100, a dual user input control mode of operation in addition to the dual content presentation mode of operation. In one or more embodiments, the dual user input control mode of operation allows the first display (105) of the electronic device 100 to be controlled independently of the second display (120).

Advantageously, this allows a first person 501 to manually control 901 the first display (105), while a second person 502 can manually control 902 the second display (120) to select and view content offerings. Effectively, the single electronic device 100 begins to function as two independent electronic devices, with the first display (105) serving as the user interface for the first person 501 and the second display (120) serving as the independently controllable user interface for the second person 502. This feature is further enabled by the fact that the second display (120) occupies a significantly large are of the exterior surface of the first device housing 102.

While the dual user input control mode of operation is being enabled due to the fact that the geometric form factor of this illustrative example constitutes the first device housing 102 being oriented substantially orthogonally with the second device housing 103, the one or more processors (112) can enable the dual user input control mode of operation can be enabled in other situations where the first display (105) is accessible by a first person 501 and the second display (120)

is accessible by a second person 502 as well. One example was described and illustrated above with reference to FIG. 6 when the electronic device 100 was pivoted to the axially displaced open position (400) and coupled to a docking station (600). Accordingly, in one or more other embodiments the one or more processors (112) also enable, in response to detecting the multiple persons within the environment 108 of the electronic device 100 while the electronic device 100 is in the axially displaced open position (400) and is coupled to the docking station (600), a dual user input control mode of operation allowing the first display (105) to be controlled independently of the second display (120), and vice versa.

In the illustrative embodiment of FIG. 9, the presence detector (111) detects a first person 501 and a second person 502 being within the environment 108 of the electronic device 100. Additionally, the presence detector (111) detects the first person 501 being positioned so as to be able to view the first display (105) and the second person 502 being positioned so as to be able to view the second display (120).

Simultaneously, the one or more geometry sensors (117) detects a predefined geometric form factor of the electronic device 100, which in this example comprises the first device housing 102 being oriented substantially orthogonally with the second device housing 103. As previously described, the predefined geometric form factor enabling the dual user input control mode of operation can be an angle of between seventy-five and one hundred and five degrees, inclusive. Other predefined geometric form factors for enabling features of the electronic device will be obvious to those of ordinary skill in the art having the benefit of this disclosure.

In one or more embodiments, in response to detecting this geometric form factor and the multiple persons within the environment 108, the one or more processors (112) of the electronic device 100 enable the dual content presentation mode of operation allowing presentation of first content 903 on the first display (105) of the electronic device 100 and second content 904 on the second device housing (103) of the electronic device 100. In this illustration, the first content 903 and the second content 904 are different content offerings.

In addition to enabling the dual content presentation mode of operation, here the one or more processors (112) of the electronic device 100 have also, in response to detecting the geometric form factor and the multiple persons within the environment 108, enabled the dual user input control mode of operation allowing the first display (105) to be controlled 901 independently of the second device housing (103). As shown in FIG. 9, the first person 501 delivers touch input to the first display (105) to control 901 the first display (105), such as to select the first content 903). Similarly, the second person 502 delivers touch input to the second device housing (103) to control 902 the second device housing (103). Thus, the first display (105) can be controlled independently of the second device housing (103) when the dual user input control mode of operation is enabled.

In the illustrative embodiment of FIG. 9, the first content 903 and the second content 904 comprise only visual content. Examples of such visual content include the presentation of email correspondence, the presentation of text messages, the presentation of pictures, the presentation of social media feeds, and the presentation of webpages. Other forms of visual only content will be obvious to those of ordinary skill in the art having the benefit of this disclosure. When the first content 903 and the second content 904 are only visual content, there is no audio associated with the first content 903 or the second content 904. The environment 108 is quiet due to the fact that both the first person 501 and the second person 502 desire to consume only visual content using the first display (105) and the second display (120), respectively and independently. Since there is no audio associated with the first content 903 or the second content 904, each person can consume their respective content silently without disrupting the other person's consumption of their other, different content.

In other situations, however, the second person 502 may want to consume only visual content on the second display (120), while the first person 501 wants to consume audiovisual content on the first display (105). Turning now to FIG. 10, illustrated therein is such a situation.

In the illustrative embodiment of FIG. 10, the presence detector (111) detects a first person 501 and a second person 502 being within the environment 108 of the electronic device 100. Additionally, the presence detector (111) detects the first person 501 being positioned so as to be able to view the first display (105) and the second person 502 being positioned so as to be able to view the second display (120).

Simultaneously, the one or more geometry sensors (117) detects a predefined geometric form factor of the electronic device 100, which in this example comprises the first device housing 102 being oriented substantially orthogonally with the second device housing 103. As previously described, the predefined geometric form factor enabling the dual user input control mode of operation can be an angle of between seventy-five and one hundred and five degrees, inclusive. Other predefined geometric form factors for enabling features of the electronic device will be obvious to those of ordinary skill in the art having the benefit of this disclosure.

In one or more embodiments, in response to detecting this geometric form factor and the multiple persons within the environment 108, the one or more processors (112) of the electronic device 100 enable the dual content presentation mode of operation allowing presentation of first content 1003 on the first display (105) of the electronic device 100 and second content 1004 on the second device housing (103) of the electronic device 100. In this illustration, the first content 1003 and the second content 1004 are different content offerings. In addition to enabling the dual content presentation mode of operation, here the one or more processors (112) of the electronic device 100 also, in response to detecting the geometric form factor and the multiple persons within the environment 108, enabled the dual user input control mode of operation allowing the first display (105) to be controlled independently of the second display (120).

In the illustrative embodiment of FIG. 10, the first content 1003 is audio-visual content. Examples of audio-visual content include videos with corresponding audio, movies, television shows, and so forth. As mentioned above, when either the first content 1003 or the second content 1004 is audio-visual content, the one or more processors (112) of the electronic device 100 can deliver the corresponding audio via different channels. Illustrating by example, the one or more processors (112) may drive a loudspeaker to audibly emit the audio content into the environment 108. Alternatively, the one or more processors (112) can electronically delivering the audio content to a companion electronic device, such as a pair of headphones or wireless ear buds. When both the first person 501 and the second person 502 are within the environment 108, the one or more processors (112) may elect to preclude delivery of both the audio content so as to prevent disturbance of the other person. Additionally, the one or more processors (112) may even multiplex the audio content with other audio content. These examples and more will be described below with reference to FIG. 14. Still other audio control options will be obvious to those of ordinary skill in the art having the benefit of this disclosure.

In one or more embodiments, the decision of how to handle the audio associated with the audio-visual content is made as a function of one or more external factors. Illustrating by example, in one or more embodiments the controlling occurs as a function of a distance between each person of the multiple persons and the electronic device 100. In other embodiments, the controlling occurs as a function of an authentication credential associated with each person of the multiple persons, which is occurring in the illustrative embodiment of FIG. 10. In still other embodiments, the controlling occurs as a function of which person of the multiple persons began consuming content at the electronic device first. These examples of control inputs and more will be described below with reference to FIG. 15. Still other inputs used for selecting an audio control operation will be obvious to those of ordinary skill in the art having the benefit of this disclosure.

In the illustrative embodiment of FIG. 10, the first person 501 is the owner of the electronic device 100. The second person 502 is authorized to use the electronic device 100 due to the fact that the first person 501 has verbally given him permission to do so, but the one or more processors (112), using the presence detector (111), authenticate the first person 501 as an authenticated authorized user. Accordingly, the first person has precedence in selecting what content to consume using the electronic device 100.

In this example, the first person 501 elects to consume audio-visual content. Accordingly, since the first person 501 is authenticated, the one or more processors (112) emit the audio content 1005 associated with the first content 1003 into the environment 108 of the electronic device 100 via a loudspeaker.

Since the first person 501 is consuming audio-visual content and has precedence over the second person 502, the second person is left with a few different options to begin independently consuming the second content 1004. If the second person 502 wants to consume audio-visual content, they could go get a pair of headphones or ear buds, thereby allowing the one or more processors (112) to deliver the corresponding audio to the headphones or ear buds without disturbing the first person 501. Alternatively, the one or more processors (112) can simply preclude the delivery of the audio content associated with the second content 1004, thereby allowing the second person 502 to consume only the visual portion of the audio-visual content.

In this illustrative example, the second person 502 has elected to consume only visual content. The second person 502 independently controls the second display (120) to cause the presentation of the second content 1004 to commence. Accordingly, the first person 501 and the second person 502 can independently control the first display (105) and the second display (120) to consume first content 1003 and second content 1004 despite the fact that the first content 1003 and the second content 1004 are different.

Turning now to FIG. 11, illustrated therein is an example in which the first person 501 and the second person 502 each desire to consume audio-visual content. As before, the presence detector (111) detects a first person 501 and a second person 502 being within the environment 108 of the electronic device 100. Additionally, the presence detector (111) detects the first person 501 being positioned so as to be able to view the first display (105) and the second person 502 being positioned so as to be able to view the second display (120).

Simultaneously, the one or more geometry sensors (117) detects a predefined geometric form factor of the electronic device 100, which in this example comprises the first device housing 102 being oriented substantially orthogonally with the second device housing 103. In response to detecting this geometric form factor and the multiple persons within the environment 108, the one or more processors (112) of the electronic device 100 enable the dual content presentation mode of operation allowing presentation of first content 1103 on the first display (105) of the electronic device 100 and second content 1104 on the second device housing (103) of the electronic device 100. Once again, the first content 1103 and the second content 1104 are different content offerings. In addition to enabling the dual content presentation mode of operation, here the one or more processors (112) of the electronic device 100 also, in response to detecting the geometric form factor and the multiple persons within the environment 108, enabled the dual user input control mode of operation allowing the first display (105) to be controlled independently of the second display (120).

Since the first content 1103 and the second content 1104 are both audio-visual content, the one or more processors (112) must control the audio content associated with the first content 1103 and the second content 1104 to prevent the each from disturbing the other person. In this illustrative example, each person has a companion device that is operable with the electronic device 100. The first person 501 has a first pair of wireless headphones 1101. Similarly, the second person 502 has a second pair of wireless headphones 1102. Accordingly, the one or more processors (112) electronically deliver the first audio content associated with the first content 1103 to the first companion electronic device, and also deliver the second audio content associated with the second content 1104 to the second companion electronic device. This allows the first person 501 and the second person 502 to independently consume audio-visual content with a single device without disturbing the other person.

Figure 12:
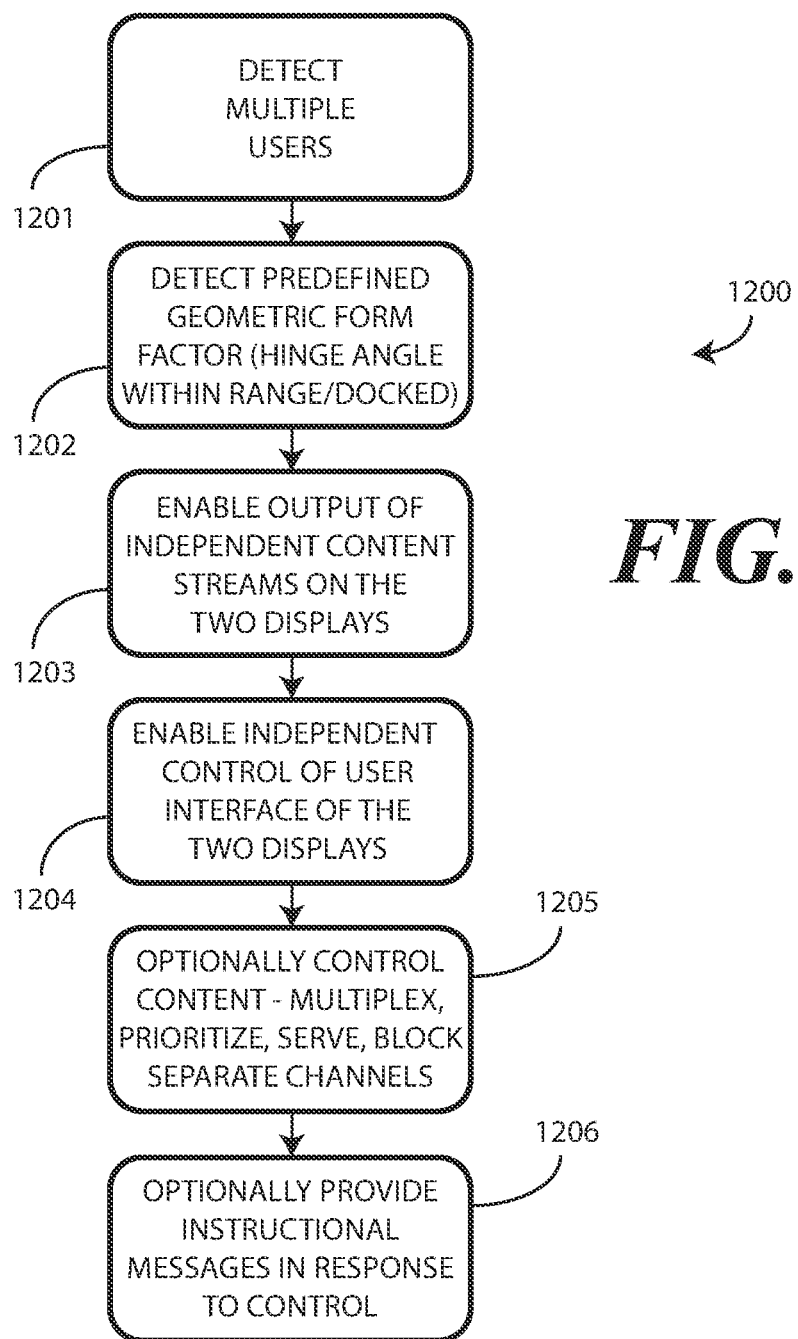
FIG. 12 illustrates one explanatory method in accordance with one or more embodiments of the disclosure.

Turning now to FIG. 12, illustrated therein is one explanatory method 1200 in accordance with one or more embodiments of the disclosure. The method 1200 is suitable for use in the electronic device (100) of FIGS. 1-11. The method 1200 further encompasses many of the examples described above with reference to FIGS. 5-11 by explaining the operation of the various components of the electronic device (100).

Beginning at step 1201, the method 1200 detects, with one or more sensors, multiple persons being within an environment of an electronic device. In one or more embodiments, step 1201 comprises detecting at least one person being positioned so as to be able to view a first display of the electronic device and a second person being positioned so as to be able to view a second display of the electronic device.

At step 1202, the method 1200 detects, with one or more other sensors, a geometric form factor defined by an amount a first device housing of the electronic device is pivoted about a hinge relative to a second device housing of the electronic device. In one or more embodiments, the geometric form factor comprises the first device housing being pivoted about the hinge relative to the second device housing to an angle of between seventy-five and one hundred and five degrees, inclusive. In another embodiment, the geometric form factor comprises a first device housing of the electronic device positioned about a hinge relative to a second device housing to an axially displaced open position with the electronic device coupled to a docking station. Other predefined geometric form factors suitable for enabling one or more features of the electronic device will be obvious to those of ordinary skill in the art having the benefit of this disclosure.

Figure 13:
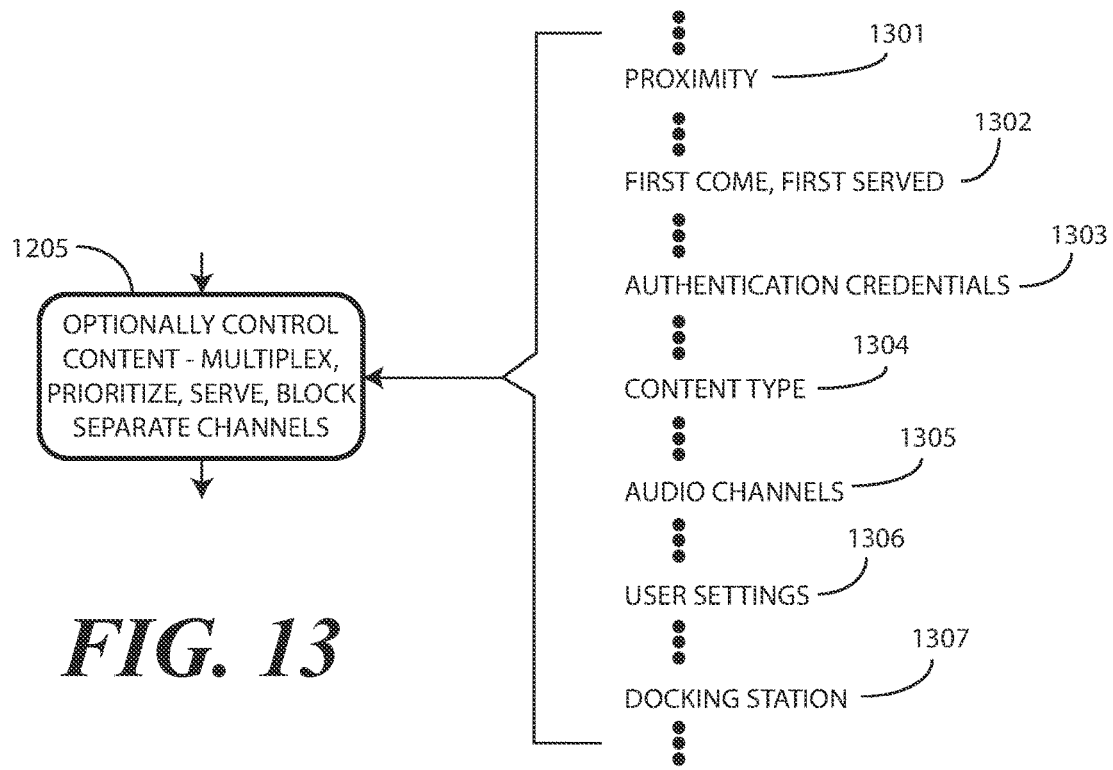
FIG. 13 illustrates one or more method steps in accordance with one or more embodiments of the disclosure.

At step 1203, the method 1200 enables, with one or more processors in response to detecting the geometric form factor and the multiple persons within the environment, a dual content presentation mode of operation allowing presentation of first content on a first display of the electronic device and second content on a second display. In one or more embodiments, the first content and the second content are different. For example, the first content may be audio-visual content while the second content is visual only content, or vice versa. Alternatively, the first content and the second content may both be audio-visual content, with the first content being a movie and the second content being a different movie or a television show, and so forth. At optional step 1204, the method 1200 also enables, with the one or more processors in response to detecting the geometric form factor and the multiple persons within the environment, a dual user input control mode of operation allowing the first display to be controlled independently of the second display and vice versa.

Where the first content and the second content are both audio-visual content offerings, with those content offerings being different, optional step 1205 controls the audio content associated with each of the first content and the second content so as to prevent disturbing any of the persons within the environment of the electronic device. Embodiments of the disclosure contemplate that simply emitting different audio content offerings into the environment could be irritating or could render those audio content offerings unintelligible. Accordingly, step 1205 prevents this from occurring by controlling, with the one or more processors, first audio content associated with the first content and second audio content associated with the second content when the first content and the second content are both audio visual content. Turning briefly to FIG. 13, illustrated therein are various ways in which this control could occur.

In one or more embodiments, step 1205 controls first audio content associated with the first content and second audio content associated with the second content as a function of proximity or distance 1301. Illustrating by example, in one or more embodiments this control as a function of proximity controls the audio as a function of a distance between each person and the electronic device. The control can comprise emitting, for instance, the audio content associated with the audio-visual content into the environment for the person who is closest to the electronic device since this audio content can be delivered at a lower volume due to the proximity. The second audio can then be delivered via another channel or precluded from delivery.

In other embodiments, step 1205 comprises controlling the audio as a function of which person of the multiple persons began consuming content at the electronic device first 1302. If, for example, a first person began consuming content before a second person, and the first person has a preferred method of consuming the audio content, e.g., by audibly delivering the audio into the environment via a loudspeaker, step 1205 gives the first user that choice. The second audio can then be delivered via another channel or precluded from delivery.

In still other embodiments, step 1205 comprises controlling the audio as a function of an authentication credential 1303 associated with each person of the multiple persons. If, for example, an authenticated user of the electronic device has a preferred method of consuming the audio content, e.g., by audibly delivering the audio into the environment via a loudspeaker, step 1205 gives the authenticated user that choice. The second audio can then be delivered via another channel or precluded from delivery.

In still other embodiments, step 1205 comprises controlling the audio as a function of the content type 1304. If, for example, a first person is consuming content having only a musical score associated as audio content, and a second person is consuming content having noisy conversation of multiple people associated as audio content, step 1205 can comprise delivering the least annoying content to the environment of the electronic device while delivering the more annoying content to another channel, such as to a companion electronic device like headphones or ear buds.

In still other embodiments, step 1205 can comprise controlling the audio as a function of available audio channels 1305. Recall from FIG. 11 above that each person had their own companion electronic device. Accordingly, in situations where the available audio channels 1305 provide a sufficient number of non-interfering channels, e.g., channels into which delivery of audio content will not interfere with other channels, step 1205 can control the audio content accordingly. Delivery of audio content to one set of headphones will not affect the delivery of other audio content to another set of headphones, as demonstrated above with reference to FIG. 11.

In still other embodiments, step 1205 can control the audio in response to one or more user settings 1306. An owner of the electronic device may set user settings using a menu or user interface such that content associated with a first display is delivered via one channel, e.g., into the environment via a loudspeaker, while content associated with a second display is delivered via another channel, e.g., to a companion electronic device.

In still other embodiments, step 1205 can process first audio content associated with the first content differently than second audio content associated with the second content in response to detecting the multiple persons within the environment of the electronic device while the electronic device is in the axially displaced open position and is coupled to the docking station 1307. For example, if the principal loudspeaker is physically oriented in the same direction as one of the two displays, step 1205 may control presentation of first audio content associated with the first content and second audio content associated with the second content by acoustically delivering the first audio content to the environment and electronically delivering the second audio content to a companion electronic device, and so forth.

Figure 14:
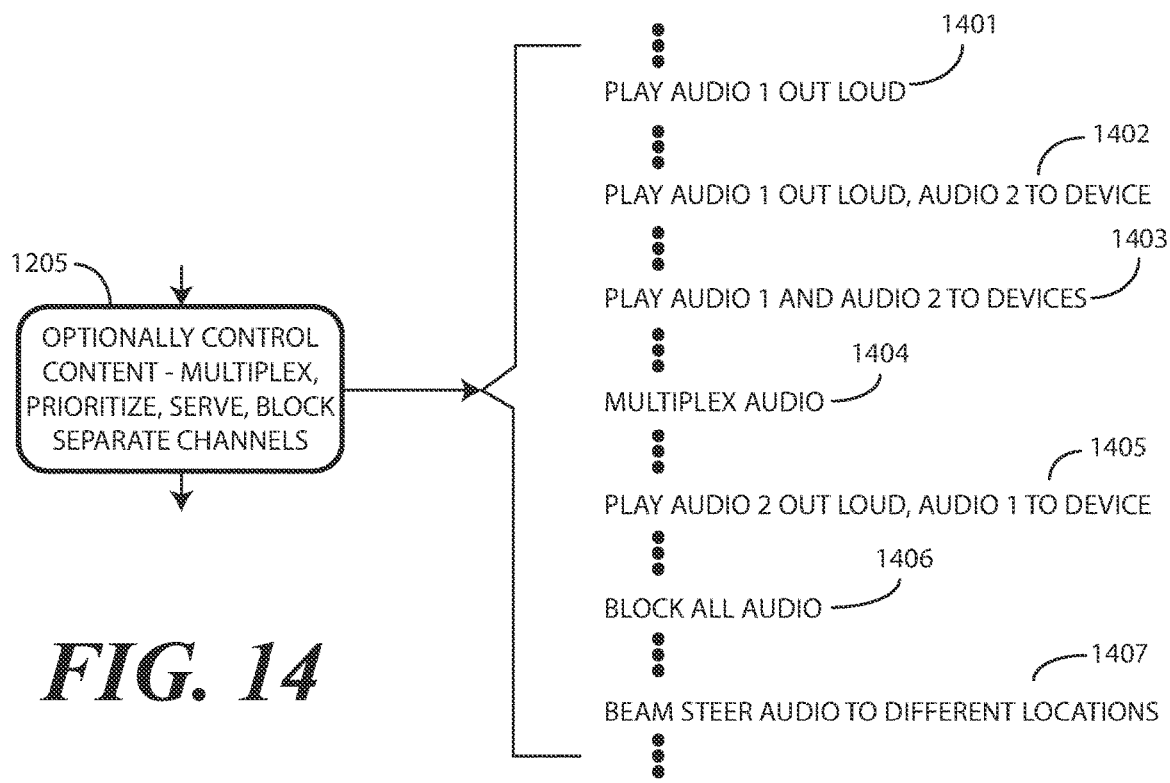
FIG. 14 illustrates one or more method steps in accordance with one or more embodiments of the disclosure.

Once the factors used in making the decision of how to control the audio are considered, the decision is made. Turning briefly to FIG. 14, illustrated therein are possible results of the decision. Many of these have been previously described.

In one or more embodiments, step 1205 comprises audibly emitting the first audio content into the environment and precluding delivery of the second audio content 1401. In other embodiments, step 1205 comprises audibly emitting the first audio content into the environment and electronically delivering the second audio content to a companion electronic device 1402. The opposite can occur by audibly emitting the second audio content into the environment and electronically delivering the first audio content to a companion electronic device 1405. Said differently, in one or more embodiments step 1205 comprises controlling presentation of first audio content associated with the first content and second audio content associated with the second content by acoustically delivering the first audio content to the environment and electronically delivering the second audio content to a companion electronic device.

In still other embodiments step 1205 comprises electronically delivering the first audio content to a first companion electronic device and also electronically delivering the second audio content to a second companion electronic device 1403. In still other embodiments, step 1205 can comprise multiplexing 1404 the first audio content and the second audio content. Illustrating by example, if the first audio content is the soundtrack corresponding to a movie, and the second audio content is intermittent, such as the occasional bird chirp associated with a bird watching video, step 1205 can comprise momentarily pausing the first audio content, playing the second audio content, and then resuming the first audio content in a multiplexed manner.

In still other embodiments, step 1205 can comprise precluding 1406 delivery of both the first audio content and the second audio content. This leaves each person to consume only the visual portions of their audio-visual content. Beam steering 1407 can be used to deliver a spot sound to each user without disturbing the other. The examples of FIG. 14 are illustrative only, as numerous other ways to perform step 1205 will be obvious to those of ordinary skill in the art having the benefit of this disclosure.

Turning now back FIG. 12, in one or more embodiments optional step 1206 can include providing one or more instructional messages in response to the control decision and result occurring at step 1205. For example, if step 1205 controls presentation of first audio content associated with the first content and second audio content associated with the second content by acoustically delivering the first audio content to the environment, the display associated with the second content may present a message saying, "if you want to hear audio, go and get some headphones!" Accordingly, if the second person fetches a companion electronic device, such as wireless headphones, step 1205 can then electronically deliver the second audio content to a companion electronic device.

Figure 15:
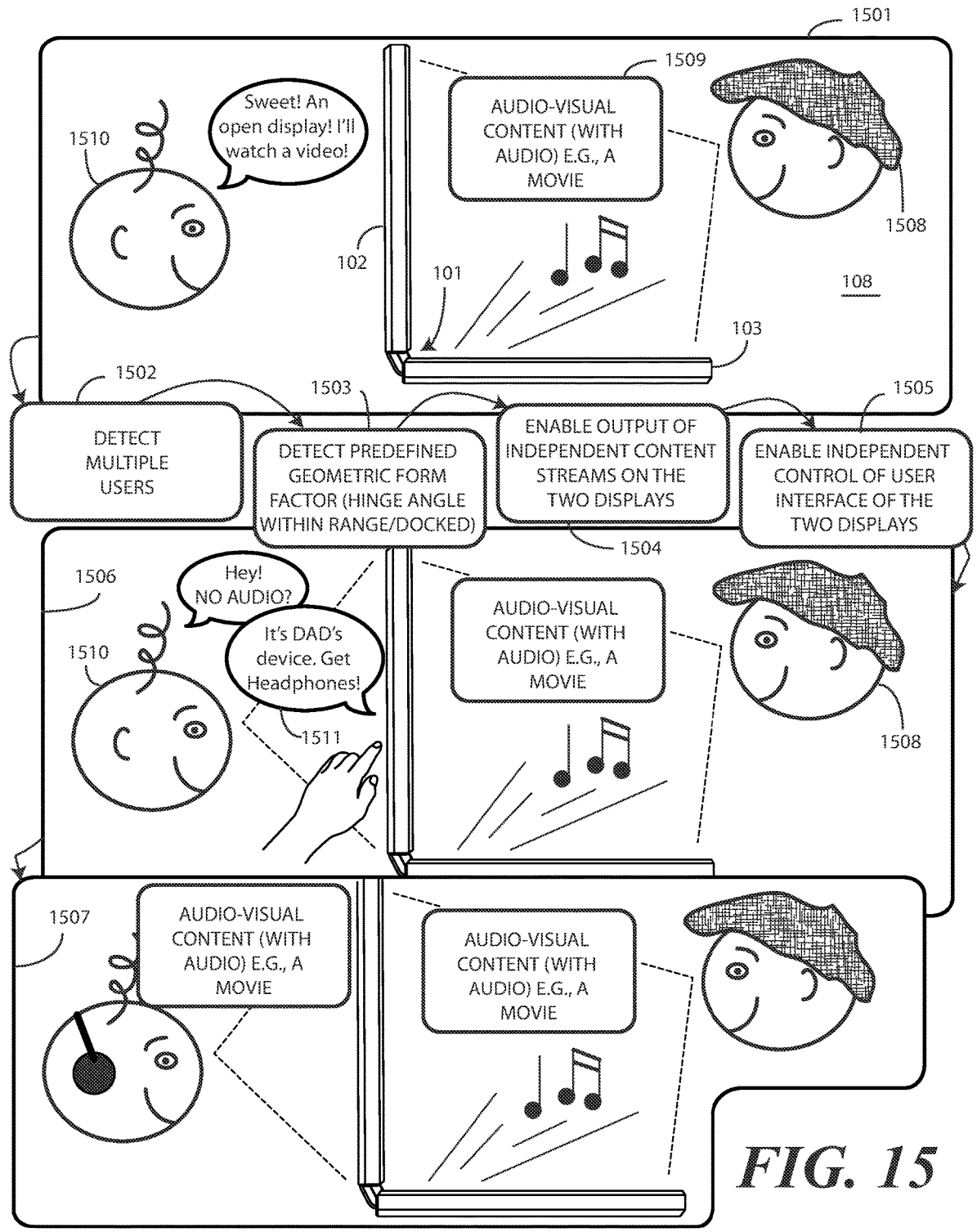
FIG. 15 illustrates one explanatory method in accordance with one or more embodiments of the disclosure.

Turning now to FIG. 15, illustrated therein is one explanatory method in accordance with one or more embodiments of the disclosure. Beginning at step 1501, an owner 1508 of an electronic device 100 has deformed the electronic device 100 into a predefined geometric form factor in which the first device housing 102 is oriented between seventy five and one hundred and five degrees about a hinge relative to a second device housing 103. One or more sensors of the electronic device detect this geometric form factor. One or more sensors of the electronic device also authenticate the owner 1508 of the electronic device 100 as an authorized user. The owner 1508 of the electronic device 100 begins to consume first content 1509, which in this example is audio-visual content. One or more processors (112) of the electronic device 100 present the visual component of the audio-visual content on a first display (105) of the electronic device 100 and emit the audio component of the audio-visual content into the environment 108 via a loudspeaker.

A second person 1510, which in this example is the owner's child, is also present within the environment 108. Seeing that huge second display (120) is both visible and accessible, the second person 1510 sees an opportunity to get some quality screen time by watching a movie. In prior art devices, this would not be possible. However, the electronic device 100 of FIG. 15 is configured in accordance with embodiments of the disclosure.

Accordingly, one or more sensors detect that multiple persons are within the environment 108 of the electronic device 100 at step 1502. When this occurs simultaneously with one or more other sensors detecting the geometric form factor defined by an amount the first device housing 102 of the electronic device 100 is pivoted about the hinge 101 relative to the second device housing 103 of the electronic device 100 at step 1503, one or more processors (112) of the electronic device enable a dual content presentation mode of operation at step 1504 allowing presentation of second content on the second display (120) of the electronic device while the first content 1509, which is different, is independently presented on the first display (105) of the electronic device 100. The one or more processors (112) also enable, in response to detecting the geometric form factor and the multiple persons within the environment, a dual user input control mode of operation at step 1505 allowing the first display to be controlled independently of the second display and vice versa.

At step 1506, the second person 1510 then controls the second display (120) independently of the first display (105) to call up a movie. However, since the one or more processors (112) are controlling the audio associated with the different content offerings as a function of an authentication credential associated with each person of the multiple persons, the first person, being the owner 1508 of the electronic device 100 as authenticated by the one or more processors (112), has precedence. The second person 1510 notices this and says, "Hey, No Audio!"

The one or more processors (112) then provide one or more instructional messages 1511 in response to audio control decision and result occurring at step 1506. In this example, the one or more instructional messages 1511 identify the control mechanism, i.e., authentication credential with dad having a higher authentication credential as owner of the electronic device than the child. The one or more instructional messages 1511 also suggest solutions that would allow the second person 1510 to hear the audio content associated with the movie. Here, the one or more instructional messages 1511 state, "go get some headphones."

The second person does this and returns at step 1507. Accordingly, the one or more processors (112) audibly emit the first audio content into the environment and electronically delivering the second audio content to a companion electronic device, which are the headphones. Each person can then control and enjoy, independently, two different audio-visual content offerings using a single device.

Figure 16:
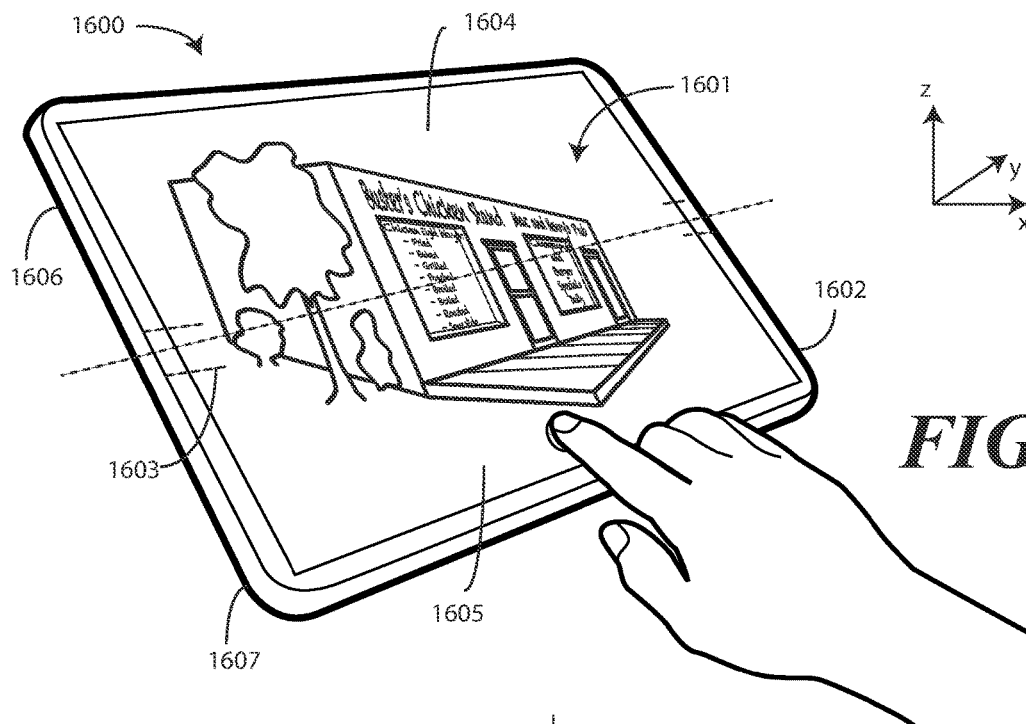
FIG. 16 illustrates another explanatory electronic device in accordance with one or more embodiments of the disclosure.

Turning now to FIG. 16, illustrated therein is another explanatory electronic device 1600 configured in accordance with one or more embodiments of the disclosure. In contrast to the electronic device (100) of FIG. 1, rather than having two displays the electronic device 1600 of FIG. 16 includes only a single display 1601, which is flexible and touch-sensitive in this illustrative embodiment. The display 1601 serves as a primary user interface for the electronic device 1600. Users can deliver user input to the display 1601 of such an embodiment by delivering touch input from a finger, stylus, or other objects disposed proximately with the display 1601. In one or more embodiments, the display 1601 is the only display of the electronic device 1600.

In one embodiment, the display 1601 is configured as an organic light emitting diode (OLED) display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 1601 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 1601 may be formed from multiple layers of flexible material such as flexible sheets of polymer or other materials. While the display 1601 of FIG. 16 is a flexible display, in other embodiments one or more rigid displays could be placed across a major face of the electronic device 1600 and used in tandem to define a display assembly. Other configurations for the display 1601 will be obvious to those of ordinary skill in the art having the benefit of this disclosure.

The explanatory electronic device 1600 of FIG. 1 also includes a housing 1602 supporting the display 1601. In one or more embodiments, the housing 1602 is flexible. In one embodiment, the housing 1602 may be manufactured from a malleable, bendable, or physically deformable material such as a flexible thermoplastic, flexible composite material, flexible fiber material, flexible metal, organic or inorganic textile or polymer material, or other materials.

In other embodiments, the housing 1602 could also be a combination of rigid segments connected by hinges, as previously described, or by flexible materials. For instance, the electronic device 1600 could alternatively include a first device housing and a second device housing with a hinge coupling the first device housing to the second device housing such that the first device housing is selectively pivotable about the hinge relative to the second device housing. The first device housing can be selectively pivotable about the hinge between a closed position, a partially open position, and an axially displaced open position.

In other embodiments, the housing 1602 could be a composite of multiple components. For instance, in another embodiment the housing 1602 could be a combination of rigid segments connected by hinges or flexible materials. Still other constructs will be obvious to those of ordinary skill in the art having the benefit of this disclosure. Where the housing 1602 is a deformable housing, it can be manufactured from a single flexible housing member or from multiple flexible housing members.

Features can be added and can be located on the front of the housing 1602, sides of the housing 1602, or the rear of the housing 1602. Illustrating by example, in one or more embodiments a first image capture device can be disposed on one side of the electronic device 1600, while a second image capture device is disposed on another side of the electronic device 1600.

In one or more embodiments when the electronic device 1600 is deformed by a bend at a deformable portion 1603 of the electronic device 1600, this results in a first display portion 1604 being situated to one side of the deformable portion 1603 and a second display portion 1605 being situated to another side of the deformable portion. In one embodiment, the electronic device 1600 includes one or more sensors (such as the geometry sensor (117) of FIG. 1 above) operable to determine a geometry of the electronic device 1600.

Illustrating by example, in one or more embodiments the one or more sensors are operable to detect the geometry of the electronic device 1600 detect angles between a first device housing portion 1606 and a second device housing portion 1607 separated from the first device housing portion 1606 by the deformable portion 1603 of the electronic device 1600. The one or more sensors operable to determine a geometry of the electronic device 1600 can detect the first device housing portion 1606 pivoting, bending, or deforming about the deformable portion 1603 relative to the second device housing portion 1607.

The one or more sensors operable to determine the geometry can take various forms. In one or more embodiments, the one or more sensors operable to determine the geometry of the electronic device 1600 comprise one or more flex sensors supported by the housing 1602 and operable with the one or more processors to detect a bending operation deforming one or more of the housing 1602 or the display 1601 into a deformed geometry, such as that shown in FIGS. 18-20. The inclusion of flex sensors is optional, and in some embodiment flex sensors will not be included.

While a flex sensor is one configuration suitable for detecting a bending operation occurring to deform the electronic device 1600 and a geometry of the electronic device 1600 after the bending operation, other sensors for detecting the geometry of the electronic device 1600 can be used as well. For instance, a magnet can be placed in the first device housing portion 1606 while a magnetic sensor is placed in the second device housing portion 1607, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the one or more sensors operable to determine a geometry of the electronic device 1600 can comprise an inductive coil placed in the first device housing portion 1606 and a piece of metal placed in the second device housing portion 1607, or vice versa. When the metal is in close proximity to the coil, the one or more sensors operable to determine a geometry of the electronic device 1600 detect the first device housing portion 1606 and the second device housing portion 1607 in a first position. By contrast, when the metal is farther away from the coil, the one or more sensors operable to determine a geometry of the electronic device 1600 can detect the first device housing portion 1606 and the second device housing portion 1607 being in a second position, and so forth.

In other embodiments the one or more sensors operable to determine a geometry of the electronic device 1600 can comprise an inertial motion unit situated in the first device housing portion 1606 and another inertial motion unit situated in the second device housing portion 1607. The one or more processors can compare motion sensor readings from each inertial motion unit to track the relative movement and/or position of the first device housing portion 1606 relative to the second device housing portion 1607, as well as the first device housing portion 1606 and the second device housing portion 1607 relative to the direction of gravity. This data can be used to determine and or track the state and position of the first device housing portion 1606 and the second device housing portion 1607 directly as they pivot about the deformable portion 1603, as well as their orientation with reference to a direction of gravity.

Where included as the one or more sensors operable to determine the geometry of the electronic device 1600, each inertial motion unit can comprise a combination of one or more accelerometers, one or more gyroscopes, and optionally one or more magnetometers, to determine the orientation, angular velocity, and/or specific force of one or both of the first device housing portion 1606 or the second device housing portion 1607. When included in the electronic device 1600, these inertial motion units can be used as orientation sensors to measure the orientation of one or both of the first device housing portion 1606 or the second device housing portion 1607 in three-dimensional space. Similarly, the inertial motion units can be used as orientation sensors to measure the motion of one or both of the first device housing portion 1606 or second device housing portion 1607 in three-dimensional space. The inertial motion units can be used to make other measurements as well.

In another embodiment the one or more sensors operable to determine a geometry of the electronic device 1600 comprise proximity sensors that detect how far a first end of the electronic device 1600 is from a second end of the electronic device 1600. Still other examples of the one or more sensors operable to determine a geometry of the electronic device 1600 will be obvious to those of ordinary skill in the art having the benefit of this disclosure.

In one or more embodiments, the one or more sensors operable to determine a geometry of the electronic device 1600 can comprise an image capture analysis/synthesis manager. When the electronic device 1600 defines a bend in the deformable portion 1603, with image capture device situated on the first device housing portion 1606 positioned to a first side of the bend and image capture device situated on the second device housing portion 1607 positioned to the second side of the bend, the image capture analysis/synthesis manager can detect that the field of view of image capture device and the field of view of image capture device converging or diverging depending upon the angle of the bend, and can determine the geometry by processing images from image capture device and image capture device to determine the angle of the bend.

If, for instance, the first device housing portion 1606 abuts the second device housing portion 1607 such that the field of view of one imager is oriented in a direction substantially opposite that of another field of view of another imager, in one or more embodiments the image capture analysis/synthesis manager can detect this fact by detecting that either neither field of view captures the same content, or if the fields of view are sufficiently wide, that only content in the periphery of each field of view is common between images captured by image capture device and image capture device.

Similarly, if the first device housing portion 1606 is oriented substantially orthogonally with the second device housing portion 1607 such that the field of view of image capture device is oriented substantially orthogonally with another field of view of image capture device, in one or more embodiments the image capture analysis/synthesis manager can detect this geometry by detecting that either field of view captures the same content only at partial peripheries. If the first device housing portion 1606 and the second device housing portion 1607 define a non-orthogonal angle where the fields of view of the imagers converge or diverge, in one or more embodiments image capture analysis/synthesis manager can detect this by detecting expected amounts of overlap of the content visible in each field of view, and so forth. Still other types of the one or more sensors operable to determine a geometry of the electronic device 1600 will be obvious to those of ordinary skill in the art having the benefit of this disclosure.

In one or more embodiments, each of the first image capture device and the second image capture device comprises an intelligent imager. Where configured as an intelligent imager, each image capture device can capture one or more images of environments about the electronic device 1600 and determine whether the object matches predetermined criteria. For example, the intelligent imager operate as an identification module configured with optical recognition such as include image recognition, character recognition, visual recognition, facial recognition, color recognition, shape recognition and the like. Advantageously, the intelligent imager can recognize whether a user's face or eyes are disposed to a first side of the electronic device 1600 when it is folded or to a second side. Similarly, the intelligent imager, in one embodiment, can detect whether the user is gazing toward a portion of the display 1601 disposed to a first side of a bend or another portion of the display 1601 disposed to a second side of a bend. In yet another embodiment, the intelligent imager can determine where a user's eyes or face are located in three-dimensional space relative to the electronic device 1600.

In addition to, or instead of the intelligent imager, one or more proximity sensors included with the other sensors and components can determine to which side of the electronic device 1600 the user is positioned when the electronic device 1600 is deformed. The proximity sensors can include one or more proximity sensor components. The proximity sensors can also include one or more proximity detector components. In one embodiment, the proximity sensor components comprise only signal receivers. By contrast, the proximity detector components include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor components comprise an infrared signal receiver so as to be able to detect infrared emissions from a person. Accordingly, the proximity sensor components require no transmitter since objects disposed external to the housing 1602 of the electronic device 1600 deliver emissions that are received by the infrared receiver. As no transmitter is required, each proximity sensor component can operate at a very low power level. Evaluations show that a group of infrared signal receivers can operate with a total current drain of just a few microamps (~10 microamps per sensor). By contrast, a proximity detector component, which includes a signal transmitter, may draw hundreds of microamps to a few milliamps.

In one embodiment, one or more proximity detector components can each include a signal receiver and a corresponding signal transmitter. The signal transmitter can transmit a beam of infrared light that reflects from a nearby object and is received by a corresponding signal receiver. The proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The electronic device 1600 of FIG. 1 can include any of the components described above with reference to the schematic block diagram of FIG. 1. These components include the one or more processors (112), the memory (113), the one or more geometry sensors (117), the presence detector (111) the other sensors (119), and/or the other components (125). It is to be understood that FIG. 16 is provided for illustrative purposes only and for illustrating components of one electronic device 1600 in accordance with embodiments of the disclosure and is not intended to be a complete schematic diagram of the various components required for an electronic device. Therefore, other electronic devices in accordance with embodiments of the disclosure may include various other components not shown in FIG. 16 or may include a combination of two or more components or a division of a particular component into two or more separate components, and still be within the scope of the present disclosure.

Figure 17:
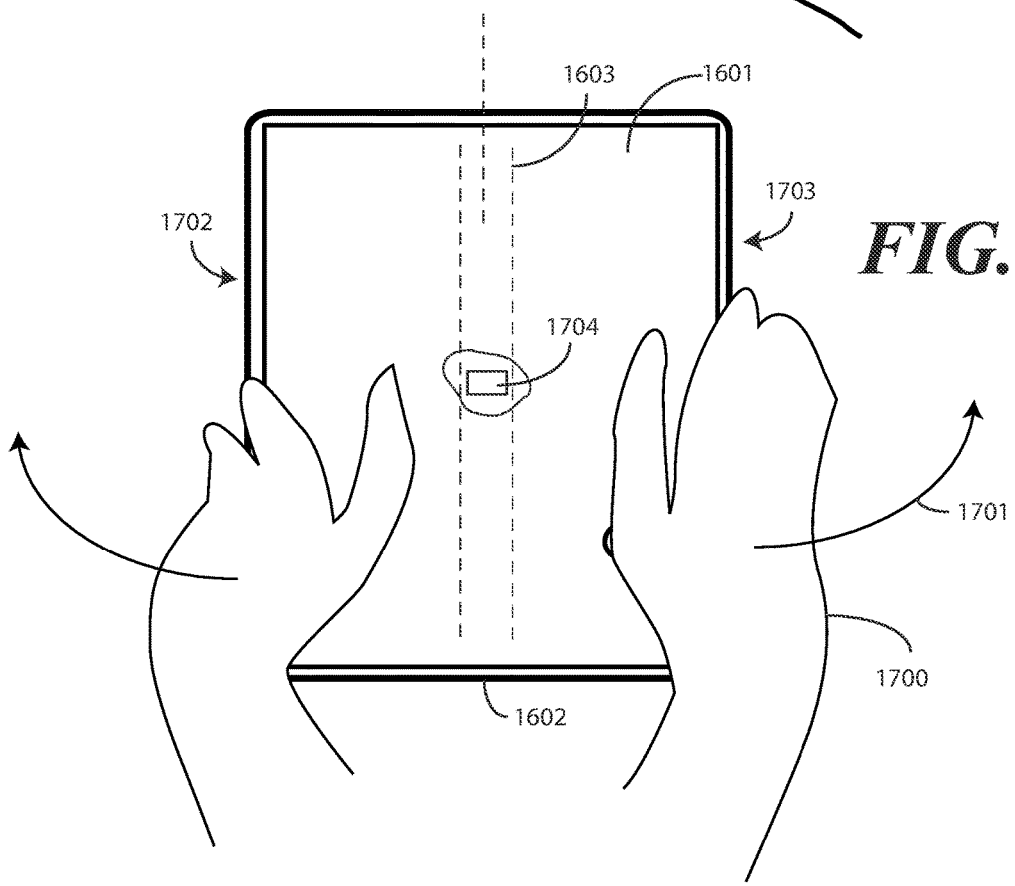
FIG. 17 illustrates a user transitioning a geometric form factor of an electronic device by manipulating the device housing in accordance with one or more embodiments of the disclosure.

Turning now to FIG. 17, a user 1700 is executing a bending operation 1701 upon the electronic device 1600 to impart deformation at a deformation portion 1603 of the electronic device 1600. In this illustration, the user 1700 is applying force (into the page) at the first side 1702 and a second side 1703 of the electronic device 1600 to bend both the housing 1602, which is deformable in this embodiment, and the display 1601 at the deformation portion 1603. Internal components disposed along flexible substrates are allowed to bend as well along the deformation portion 1603. This method of deforming the housing 1602 and display 1601 allows the user 1700 to simply and quickly bend the electronic device 1600 into a desired deformed physical configuration or shape.

In other embodiments, rather than relying upon the manual application of force, the electronic device can include a mechanical actuator 1704, operable with the one or more processors, to deform the device housing 1602 and the display 1601 by one or more bends. For example, a motor or other mechanical actuator can be operable with structural components to bend the electronic device 1600 to predetermined angles and physical configurations in one or more embodiments. The use of a mechanical actuator 1704 allows a precise bend angle or predefined deformed physical configurations to be repeatedly achieved without the user 1700 having to make adjustments. However, in other embodiments the mechanical actuator 1704 will be omitted to reduce component cost.

Figure 18:
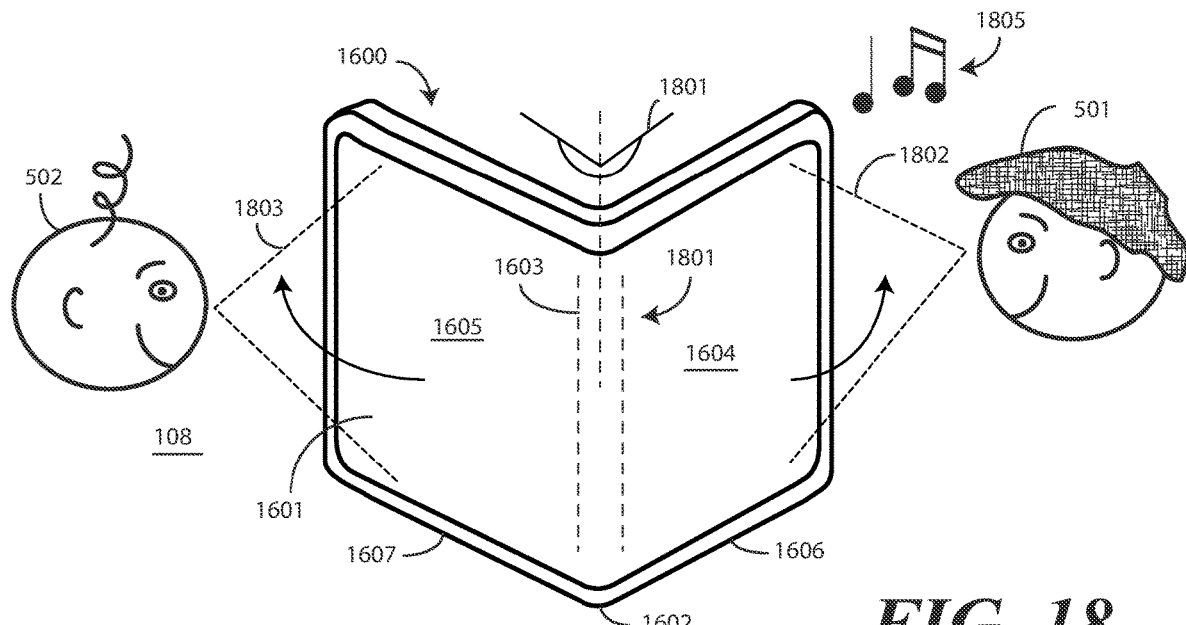
FIG. 18 illustrates one explanatory electronic device operating in a dual content presentation mode of operation in accordance with one or more embodiments of the disclosure.

Regardless of whether the bending operation 1701 is a manual one or is instead one performed by a mechanical actuator 1704, it results in the device housing 1602 and the display 1601 being deformed by one or more bends. One result of the bending operation 1701 is shown in FIG. 18. In this illustrative embodiment, the electronic device 1600 is deformed by a single bend at the deformation portion 1603. However, in other embodiments, the one or more bends can comprise a plurality of bends, as shown below in FIG. 20. Other deformed configurations will be obvious to those of ordinary skill in the art having the benefit of this disclosure.

In one embodiment, the one or more processors of the electronic device 1600 are operable to detect that a bending operation (1701) is occurring by detecting a change in an impedance of the one or more geometry sensors. The one or more processors can detect this bending operation (1701) in other ways as well. For example, the touch sensors can detect touch and pressure from the user. Alternatively, the proximity sensors can detect the first side (1702) and the second side (1703) of the electronic device 1600 getting closer together. Force sensors can detect an amount of force that the user is applying to the housing 1602 as well. The user can input information indicating that the electronic device 1600 has been bent using the display 1601 or other user interface. Inertial motion sensors can be used as previously described. Other techniques for detecting that the bending operation has occurred will be obvious to those of ordinary skill in the art having the benefit of this disclosure.

In one or more embodiments, one or more sensors of the electronic device 1600 detect a geometry of the electronic device 1600 after the bending operation (1701). For example, one or more geometry sensors can detect the deformation occurring in the device housing 1602 and flexible display 1601, which spans the deformable portion 1603. In the illustrative embodiment of FIG. 18, the geometry is a deformed geometry defined by an obtuse angle 1801 defined between the first device housing portion 1606 relative to the second device housing portion 1607. The obtuse angle 1801 of FIG. 18 is "obtuse" in that the visible portion of the flexible display 1601 is bent beyond 180 degrees. Said differently, the first device housing portion 1606 has been pivoted about the deformable portion 1603 relative to the second device housing portion 1607 to an obtuse angle 1801 of more than 180 degrees.

In one or more embodiments, one or more other sensors, such as a presence detector, detect multiple persons being within an environment 108 of the electronic device 1600. In the illustrative embodiment of FIG. 18, a first person 501 and a second person 502 are within the environment 108 of the electronic device 1600. In one or more embodiments, one or more processors of the electronic device 1600 then enable, in response to detecting the geometry and the multiple persons within the environment 108, a dual content presentation mode of operation allowing presentation of first content 1802 on a first display portion 1604 of the flexible display 1601 situated to one side of the deformable portion 1603. Simultaneously, the dual content presentation mode of operation allows for the presentation of second content 1803 on a second display portion 1605 of the flexible display 1601 situated to another side of the deformable portion 1603. In one or more embodiments, the first content 1802 and the second content 1803 are different. For instance, the first content 1802 might be the display of an email message, while the second content 1803 is a feature length movie.

As previously described, the one or more processors can also enable, in response to detecting the geometry and the multiple persons within the environment, a dual user input control mode of operation allowing the first display portion 1604 to be controlled independently of the second display portion 1605. Illustrating by example, the first person 501 may deliver touch input to the first display portion 1604 to play, pause, rewind, and fast forward the feature length movie, while the second person 502 delivers other touch input to the second display portion 1605 to scroll through the email, and so forth.

Audio content 1805 associated with the first content 1802, or where the second content 1803 comprises audio content as well, the second content, can be controlled as previously described above with reference to FIGS. 13-14. To wit, the one or more processors of the electronic device 1600 can control audio content 1805 associated with the first content 1802 or the second content 1803 when the first content 1802 and the second content 1803 are audio-visual content offerings. This can include controlling the audio content 1805 as a function of the distance (1301) between each person of the multiple persons and the electronic device 1600, as a function of an authentication credential (1303) associated with each person of the multiple persons, or as a function of which person of the multiple persons began consuming content at the electronic device 1600 first (1302). These or other control techniques can result in the audio content 1805 being emitted into the environment 108 while other audible content associated with the second content 1803 is delivered to a companion electronic device (1402), precluding (1406) the delivery of audio content 1805 associated with the first content 1802 or other audio content associated with the second content 1803, multiplexing (1404) the audio content 1805 associated with the first content 1802 or other audio content associated with the second content 1803, or electronically delivering the audio content 1805 associated with the first content 1802 or other audio content associated with the second content 1803 to two different companion electronic devices (1402,1403).

It should be noted that while the electronic device 1600 of FIG. 18 includes a deformable device housing 1602, similar operations could be performed with the electronic device (100) of FIG. 1. Illustrating by example, the deformable portion 1603 could be replaced by a hinge, while the first device housing portion 1606 is replaced by a first device housing. Similarly, the second device housing portion 1607 could be replaced by a second device housing. Accordingly, the first device housing portion 1606 could comprise a first device housing, while the second device housing portion 1607 comprises a second device housing, with the two coupled together by a hinge rather than a deformable portion 1603. In other words, the deformable portion 1603 could be defined by a hinge coupling the first device housing to the second device housing such that the first device housing is pivotable about the hinge relative to the second device housing from a closed position to an axially displaced open position to the obtuse angle 1801, and so forth.

Figure 19:
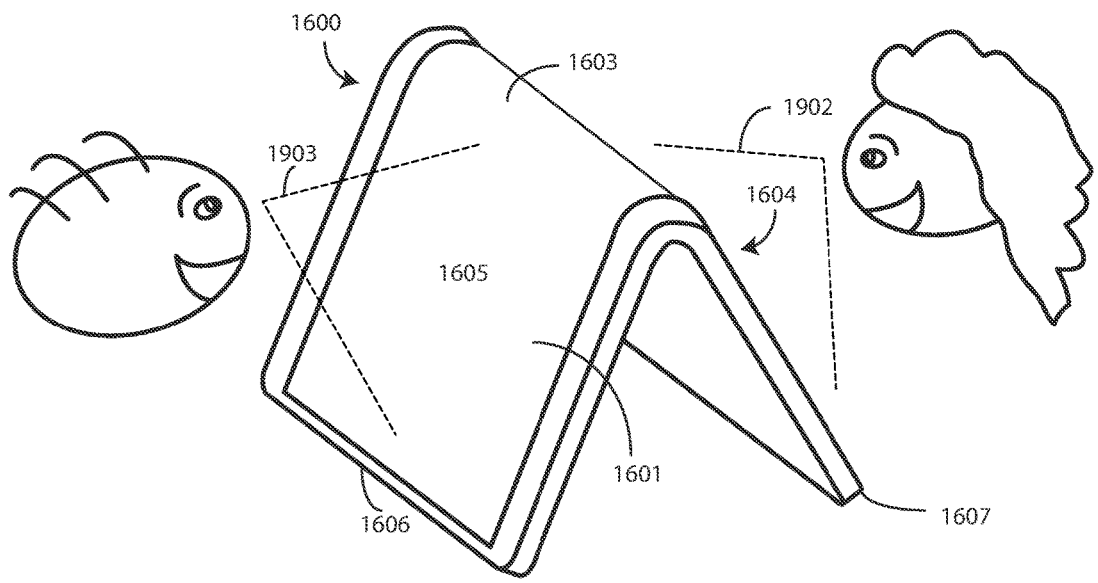
FIG. 19 illustrates another explanatory electronic device operating in a dual content presentation mode of operation in accordance with one or more embodiments of the disclosure.

Turning now to FIG. 19, the electronic device 1600 has been rotated by 90 degrees to a "tent" position. As before, a first device housing portion 1606 is separated from a second device housing portion 1607 by a deformable portion 1603 such that the first device housing portion 1606 is pivotable about the deformable portion 1603 relative to the second device housing portion 1607 between at least a closed position and the obtuse angle shown in FIG. 19.

In one or more embodiments, one or more sensors are operable to determine whether the first device housing portion 1606 and the second device housing portion 1607 define the obtuse angle. The flexible display 1601 is again coupled to the first device housing portion 1606 and the second device housing portion 1607 while spanning the deformable portion 1603. Accordingly, the flexible display 1601 is deformed when the first device housing portion 1606 and the second device housing portion 1607 are bent to the obtuse angle.

One or more processors of the electronic device 1600 then enable a dual content presentation mode of operation allowing the presentation of first content 1902 on a first display portion 1604 situated to one side of the deformable portion 1603 and second content 1903 on a second display portion 1605 situated to another side of the deformable portion 1603 when the one or more sensors detect the first device housing portion 1606 and the second device housing portion 1607 defining the obtuse angle.

In one or more embodiments, when one or more sensors of the electronic device 1600 detect a plurality of persons within the environment of the electronic device 1600, the one or more processors further enable a dual user input control mode of operation allowing user input received at the first display portion 1604 and other user input received at the second display portion 1605, respectively, to independently control the first display portion 1604 and the second display portion 1605.

Audio content associated with the first content 1902, or where the second content 1903 comprises audio content as well, the second content, can be controlled as previously described above with reference to FIGS. 13-14. In one or more embodiments, the one or more processors of the electronic device 1600 control audio content associated with the first content 1902 or the second content 1903 when the first content 1902 and the second content 1903 are audio-visual content offerings.

Several advantages offered by the "bendability" of embodiments of the disclosure are illustrated in FIG. 19. For instance, in one or more embodiments the one or more processors of the electronic device 1600 are operable to, when the display 1601 is deformed by one or more bends, present content, information, and/or user actuation targets on a first portion of the display 1601 disposed to a first side of the deformable portion, while another person is able to consume completely different content on a second portion of the display 1601 disposed to the other side of the deformable portion. This allows two persons to consume completely different content, controlled independently, on a single display as a result of the one or more sensors detecting the obtuse angle and multiple persons within the environment. Additionally, where the electronic device 1600 is configured in the physical configuration shown in FIGS. 18-19, which resembles a card folded into a "tent fold," the electronic device 1600 can stand on its side or ends on a flat surface such as a table. This configuration can make the display 1601 easier for the two users to independently view since they do not have to hold the electronic device 1600 in their hands.

In addition to illustrating advantages of having a deformable housing, a comparison of FIGS. 16-19 with FIGS. 1-11 further illustrates fundamental differences stemming from a hinged device including two displays and a deformable device (hinged or otherwise) having only a single display. With the latter, the dual content presentation mode of operation not only splits a single display into two different visual cutouts to be independently consumed by two different users, thereby leveraging a split screen functionality, but the audio control mechanisms performed by the one or more processors also manage audio routing based on whether the two different content offerings being presented contain audio pertaining to each display content offering.

When the audio control, the dual content presentation mode of operation, and/or the dual user input control mode of operation are actuated can be a design feature as well. For instance, in one or more embodiments one or more of the audio control, the dual content presentation mode of operation, and/or the dual user input control mode of operation are actuated ONLY when an electronic device is deformed into the last stage where it is completely or almost folded, with one part of the display facing the end user and the other part of the user facing away from the user. Accordingly, the display of FIGS. 16-19 effectively becomes a single display that functions as a "multi-angle view display." In one or more embodiments, the multi-angle view display may be a foldable device with one display, but when folded outward, part of the folded display can be viewed generally from the front and part of the folded display can be viewed from the back.

Figure 20:
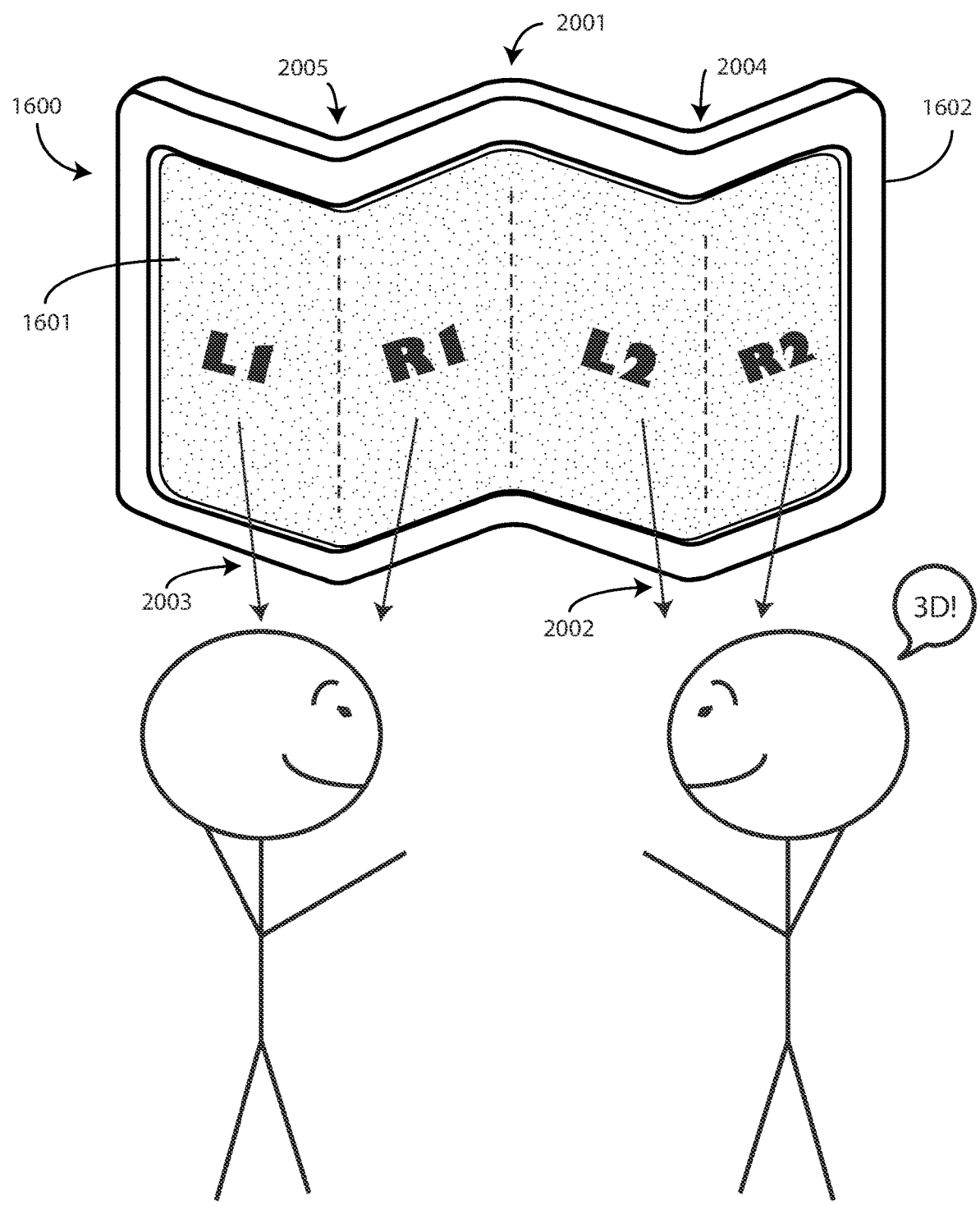
FIG. 20 illustrates still another explanatory electronic device operating in a dual content presentation mode of operation in accordance with one or more embodiments of the disclosure.

Turning now to FIG. 20, in one or more embodiments the one or more sensors of the electronic device 1600 are operable to detect multiple bends occurring in the device housing 1602. When multiple bends are present in the electronic device, the first content 2002 and the second content 2003 presented when the one or more processors operate in the dual content presentation mode of operation can become more advanced. In the illustrative embodiment of FIG. 20, the first content 2002 and the second content 2003 are both three-dimensional content, albeit different three-dimensional content. Accordingly, in one or more embodiments one or more processors operable with one or more sensors of the electronic device 1600 and the flexible display 1601 enable a dual content presentation mode of operation allowing presentation of first content 2002 on a first display portion of the flexible display 1601 situated to one side of a centrally located deformable portion 2001 and second content 2003 on a second display portion of the flexible display 1601 situated to another side of the centrally located deformable portion 2001 when the one or more sensors detect that the electronic device 1600 is deformed at the centrally located deformable portion 2001.

In one or more embodiments, when the one or more sensors detect additional deformations 2004,2005 situated to one or both sides of the centrally located deformable portion 2001 the one or more processors can elect to deliver three-dimensional content as one or both of the first content 2002 or the second content 2003. For example, the first content 2002 can comprise stereoscopic image content is delivered to a left eye and a right eye of a person. The second content 2003 can also comprise stereoscopic image content delivered to the left eye and right eye of the other person. This allows the brain of each user to synthesize the images into one or more three-dimensional images. Thus, as demonstrated by FIG. 20, embodiments of the disclosure are not limited to folded configurations having a single bend. To the contrary, embodiments of the disclosure can be used with multiple bends as well. Other advantages and modifications will be obvious to those of ordinary skill in the art having the benefit of this disclosure.

Figure 21:
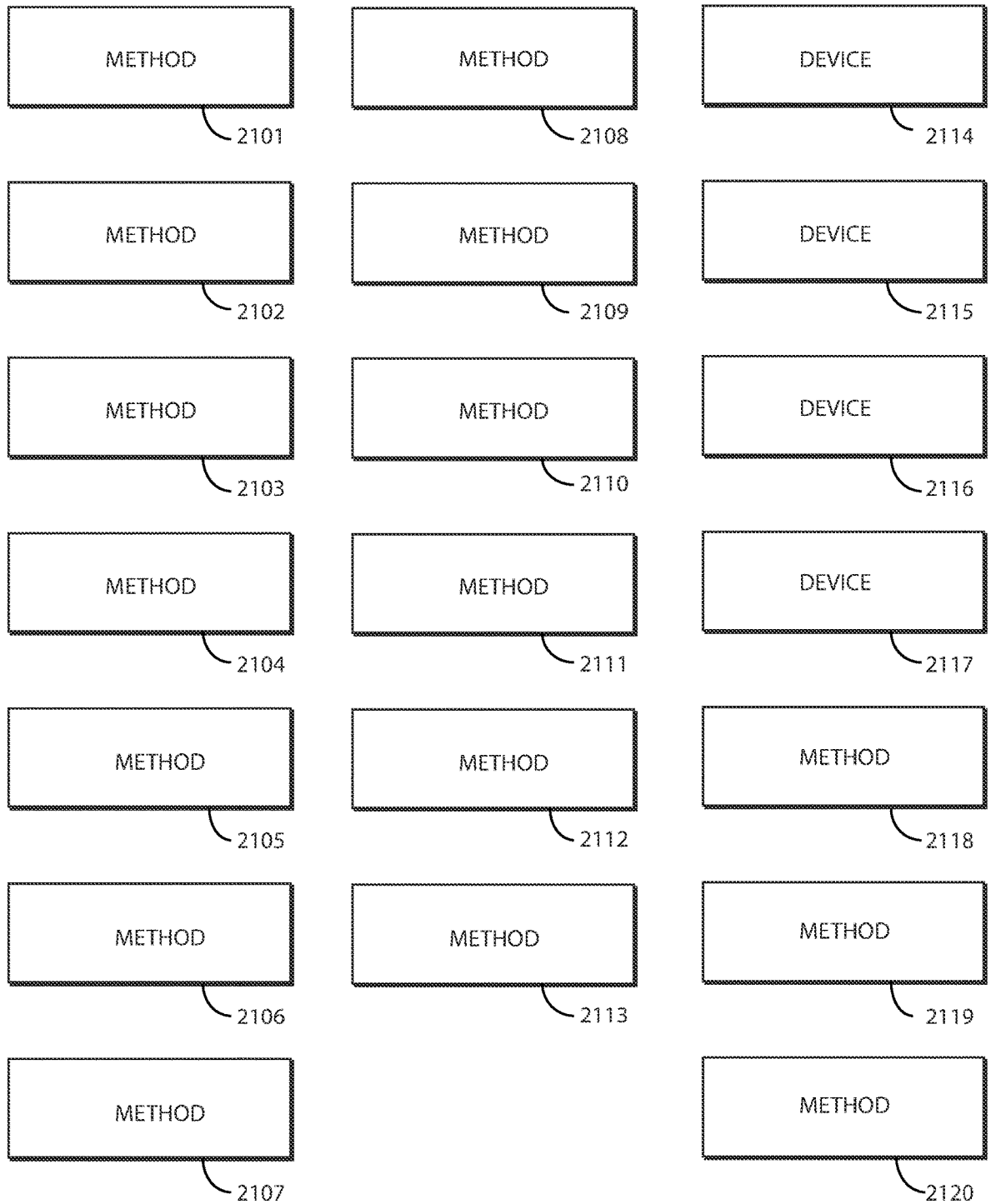
FIG. 21 illustrates various embodiments of the disclosure.

Turning now to FIG. 21, illustrated therein are various embodiments of the disclosure. The embodiments of FIG. 21 are shown as labeled boxes in FIG. 21 due to the fact that the individual components of these embodiments have been illustrated in detail in FIGS. 1-20, which precede FIG. 21. Accordingly, since these items have previously been illustrated and described, their repeated illustration is no longer essential for a proper understanding of these embodiments. Thus, the embodiments are shown as labeled boxes.

At 2101, a method in an electronic device comprises detecting, with one or more sensors, a geometric form factor defined by an amount a first device housing of the electronic device is pivoted about a hinge relative to a second device housing of the electronic device. At 2101, the method comprises also detecting, with one or more other sensors, multiple persons within an environment of the electronic device.

At 2101, the method comprises enabling, with one or more processors in response to detecting the geometric form factor and the multiple persons within the environment, a dual content presentation mode of operation. At 2101, the dual content presentation mode of operation allows presentation of first content on a first display of the electronic device and second content on a second display where the first content and the second content are different.

At 2102, the method of 2101 further comprises also enabling, with the one or more processors in response to detecting the geometric form factor and the multiple persons within the environment, a dual user input control mode of operation. At 2102, the dual user input control mode of operation allows the first display to be controlled independently of the second display and vice versa.

At 2103, the geometric form factor of 2102 comprises the first device housing being pivoted about the hinge relative to the second device housing to an angle of between seventy-five and one hundred and five degrees, inclusive. At 2104, the first display of 2103 comprises a flexible display coupled to the first device housing and the second device housing and spanning the hinge. At 2104, the second display is coupled only to the first device housing.

At 2105, the method of 2103 further comprises controlling, with the one or more processors, first audio content associated with the first content and second audio content associated with the second content. At 2105, the controlling occurs when the first content and the second content are both audio-visual content.

At 2106, the controlling of 2105 occurs as a function of a distance between each person of the multiple persons and the electronic device. At 2107, the controlling of 2105 occurs as a function of an authentication credential associated with each person of the multiple persons.

At 2108, the controlling of 2105 occurs as a function of which person of the multiple persons began consuming content at the electronic device first. At 2109, the controlling of 2105 comprises audibly emitting the first audio content into the environment and electronically delivering the second audio content to a companion electronic device.

At 2110, the controlling of 2105 comprises precluding delivery of both the first audio content and the second audio content. At 2111, the controlling of 2105 comprises electronically delivering the first audio content to a first companion electronic device and also electronically delivering the second audio content to a second companion electronic device. At 2112, the controlling of 2105 comprises multiplexing the first audio content and the second audio content.

At 2113, the geometric form factor of 2101 comprises a first device housing of the electronic device positioned about a hinge relative to a second device housing to an axially displaced open position with the electronic device coupled to a docking station.

At 2114, an electronic device comprises a first device housing coupled to a second device housing by a hinge such that the first device housing is pivotable about the hinge relative to the second device housing between a closed position and an axially displaced open position. At 2114, the electronic device comprises one or more sensors operable to determine a geometric form factor of the electronic device defined by how far the first device housing is pivoted about the hinge relative to the second device housing.

At 2114, the electronic device comprises a first display coupled to the first device housing. At 2114, the electronic device comprises a second display coupled to the first device housing. At 2114, the electronic device comprises one or more processors operable with the one or more sensors, the first display, and the second display. At 2114, the one or more processors enable a dual content presentation mode of operation allowing presentation of first content on the first display and second content on the second display when the one or more sensors detect a predefined geometric form factor.

At 2115, the electronic device of 2114 further comprises one or more other sensors operable with the one or more processors to detect a number of persons within an environment of the electronic device. At 2115, the one or more processors further enable a dual user input control mode of operation allowing user input received at the first display and the second display, respectively, to independently control the first display and the second display when the one or more other sensors detect a plurality of persons within the environment.

At 2116, the one or more processors of 2115 control presentation of first audio content associated with the first content and second audio content associated with the second content by acoustically delivering the first audio content to the environment and electronically delivering the second audio content to a companion electronic device. At 2117, the one or more processors of 2116 control the presentation of the first audio content and the second audio content as a function of which person of the plurality of persons is identified by the one or more other sensors as an authorized user of the electronic device.

At 2118, a method in an electronic device comprises detecting, with at least a first sensor, a first device housing of the electronic device positioned in an axially displaced open position relative to a second device housing coupled to the first device housing by a hinge. At 2118, the method comprises detecting, with at least a second sensor, the electronic device being electronically coupled to a docking station.

At 2118, the method comprises detecting, with at least a third sensor, multiple persons within an environment of the electronic device while the electronic device is in the axially displaced open position and is coupled to the docking station. At 2118, the method enables, with one or more processors in response to detecting the multiple persons within the environment of the electronic device while the electronic device is in the axially displaced open position and is coupled to the docking station, a dual content presentation mode of operation allowing presentation of first content on a first display of the electronic device and second content on a second display where the first content and the second content are different.

At 2119, the method of 2118 further comprises also enabling, with the one or more processors in response to detecting the multiple persons within the environment of the electronic device while the electronic device is in the axially displaced open position and is coupled to the docking station, a dual user input control mode of operation allowing the first display to be controlled independently of the second display and vice versa. At 2120, the method of 2119 further comprises processing first audio content associated with the first content differently than second audio content associated with the second content in response to detecting the multiple persons within the environment of the electronic device while the electronic device is in the axially displaced open position and is coupled to the docking station.

Figure 22:
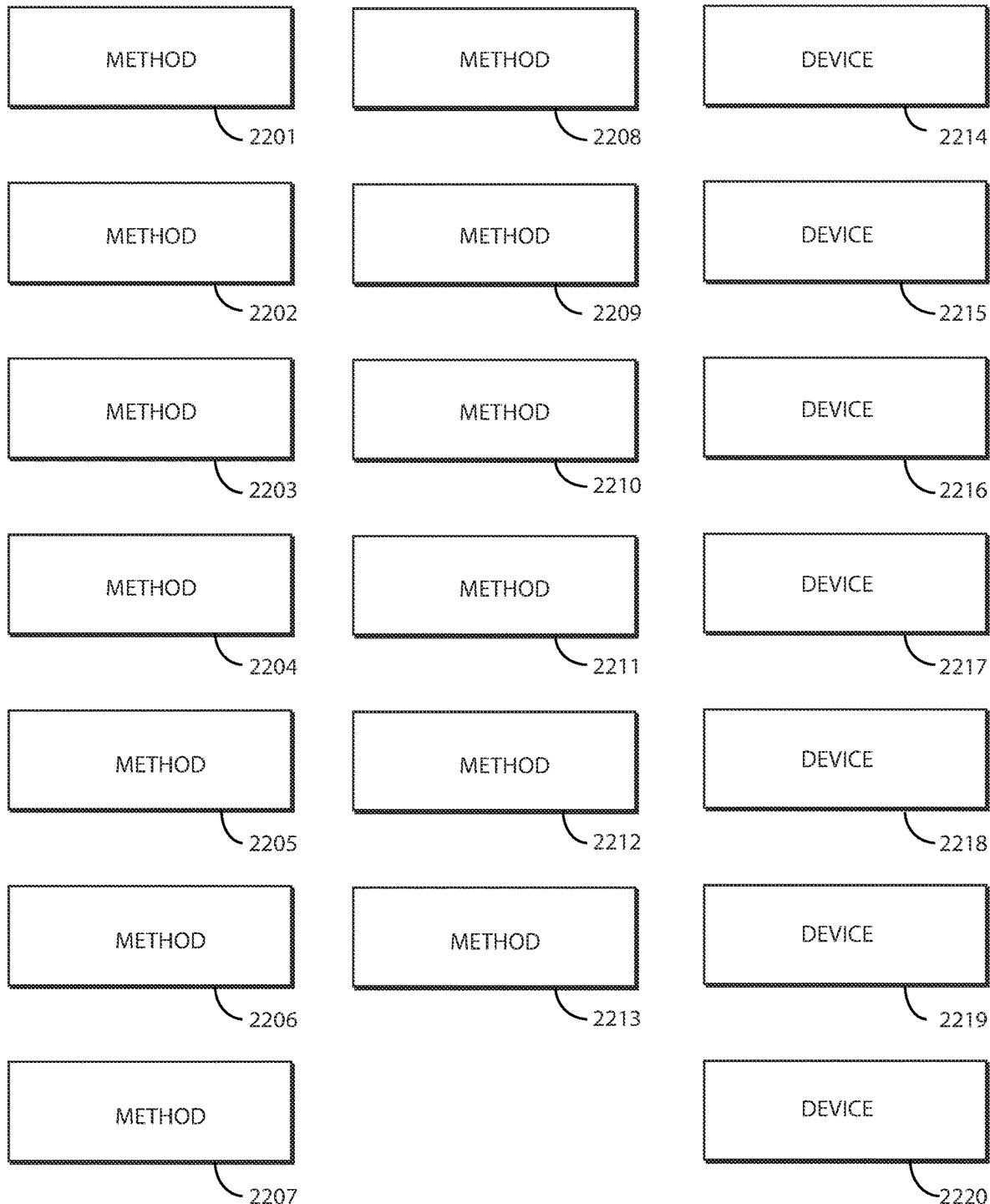
FIG. 22 illustrates various other embodiments of the disclosure.

Turning now to FIG. 22, illustrated therein are various other embodiments of the disclosure. As with FIG. 21, the embodiments of FIG. 22 are shown as labeled boxes in FIG. 22 due to the fact that the individual components of these embodiments have been illustrated in detail in FIGS. 1-20, which precede FIG. 22. Accordingly, since these items have previously been illustrated and described, their repeated illustration is no longer essential for a proper understanding of these embodiments. Thus, the embodiments are shown as labeled boxes.

Beginning at 2201, a method comprises detecting, with one or more sensors, a geometry of a deformable electronic device comprising a flexible display spanning a deformable portion of the deformable electronic device. At 2201, the geometry is defined by an obtuse angle defined between a first device housing portion of the deformable electronic device relative to a second device housing portion of the deformable electronic device.

At 2201, the method also comprises detecting, with one or more other sensors, multiple persons within an environment of the deformable electronic device. At 2201, the method comprises enabling, with one or more processors in response to detecting the geometry and the multiple persons within the environment, a dual content presentation mode of operation allowing presentation of first content on a first display portion of the flexible display situated to one side of the deformable portion and second content on a second display portion of the flexible display situated to another side of the deformable portion, where the first content and the second content are different.

At 2202, the method of 2201 further comprises enabling, with the one or more processors in response to detecting the geometry and the multiple persons within the environment, a dual user input control mode of operation allowing the first display portion to be controlled independently of the second display portion and vice versa. At 2203, the geometric form factor of 2202 comprises the first device housing portion being pivoted about the deformable portion relative to the second device housing portion to an angle of more than one hundred and eighty degrees.

At 2204, the first display of 2203 is the only display of the electronic device. At 2205, the method of 2203 further comprises controlling, with the one or more processors, first audio content associated with the first content and second audio content associated with the second content when the first content and the second content are both audio visual content.

At 2206, the controlling of 2205 occurs as a function of a distance between each person of the multiple persons and the electronic device. At 2207, the controlling of 2205 occurs as a function of an authentication credential associated with each person of the multiple persons.

At 2208, the controlling of 2205 occurs as a function of which person of the multiple persons began consuming content at the deformable electronic device first. At 2209, the controlling of 2205 comprises audibly emitting the first audio content into the environment and electronically delivering the second audio content to a companion electronic device.

At 2210, the controlling of 2205 comprises precluding delivery of both the first audio content and the second audio content. At 2211, the controlling of 2205 comprises electronically delivering the first audio content to a first companion electronic device and also electronically delivering the second audio content to a second companion electronic device. At 2212, the controlling of 2205 comprises multiplexing the first audio content and the second audio content.

At 2213, the first device housing portion of 2201 comprises a first device housing, while the second device housing portion comprises a second device housing. At 2213, the deformable portion of 2201 is defined by a hinge coupling the first device housing to the second device housing such that the first device housing is pivotable about the hinge relative to the second device housing from a closed position to at least the obtuse angle. At 2214, at least one of the first content or the second content of 2201 comprises three-dimensional content.

At 2115, an electronic device comprises a first device housing portion separated from a second device housing portion by a deformable portion such that the first device housing portion is pivotable about the deformable portion relative to the second device housing portion between a closed position and an obtuse angle. At 2115, the electronic device comprises one or more sensors operable to determine whether the first device housing portion and the second device housing portion define the obtuse angle.

At 2115, the electronic device comprises a flexible display coupled to the first device housing portion and the second device housing portion and spanning the deformable portion. At 2115, the electronic device comprises one or more processors operable with the one or more sensors and the flexible display. At 2115, the one or more processors enable a dual content presentation mode of operation allowing presentation of first content on a first display portion of the flexible display situated to one side of the deformable portion and second content on a second display portion of the flexible display situated to another side of the deformable portion when the one or more sensors detect that the first device housing portion and the second device housing portion define the obtuse angle.

At 2116, the electronic device of 2115 further comprises one or more other sensors operable with the one or more processors to detect a number of persons within an environment of the electronic device. At 2115, the one or more processors further enable a dual user input control mode of operation allowing user input received at the first display portion and the second display portion, respectively, to independently control the first display portion and the second display portion when the one or more other sensors detect a plurality of persons within the environment.

At 2117, the one or more processors of 2115 control presentation of first audio content associated with the first content and second audio content associated with the second content by acoustically delivering the first audio content to the environment and electronically delivering the second audio content to a companion electronic device.

At 2118, the one or more processors of 2115 control the presentation of the first audio content and the second audio content as a function of which person of the plurality of persons is identified by the one or more other sensors as an authorized user of the electronic device.

At 2119, the first device housing portion of 2115 comprises a first device housing, while the second device housing portion comprises a second device housing. At 2119, the deformable portion of 21115 is defined by a hinge coupled between the first device housing and the second device housing. At 2120, the first device housing of 2119 is pivotable about the hinge between a closed position where the first display portion and the second display portion abut and at least the obtuse angle.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:
    detecting, with one or more sensors, a geometric form factor defined by an amount a first device housing of the electronic device is pivoted about a hinge relative to a second device housing of the electronic device;
    also detecting, with one or more other sensors, multiple persons within an environment of the electronic device; and
    enabling, with one or more processors in response to detecting the geometric form factor and the multiple persons within the environment, a dual content presentation mode of operation allowing presentation of first content on a first display of the electronic device and second content on a second display where the first content and the second content are different.

2. The method of claim 1, further comprising also enabling, with the one or more processors in response to detecting the geometric form factor and the multiple persons within the environment, a dual user input control mode of operation allowing the first display to be controlled independently of the second display and vice versa.

3. The method of claim 2, wherein the geometric form factor comprises the first device housing being pivoted about the hinge relative to the second device housing to an angle of between seventy-five and one hundred and five degrees, inclusive.

4. The method of claim 3, wherein the first display comprises a flexible display coupled to the first device housing and the second device housing and spanning the hinge, and the second display is coupled only to the first device housing.

5. The method of claim 3, further comprising controlling, with the one or more processors, first audio content associated with the first content and second audio content associated with the second content when the first content and the second content are both audio visual content.

6. The method of claim 5, wherein the controlling occurs as a function of a distance between each person of the multiple persons and the electronic device.

7. The method of claim 5, wherein the controlling occurs as a function of an authentication credential associated with each person of the multiple persons.

8. The method of claim 5, wherein the controlling occurs as a function of which person of the multiple persons began consuming content at the electronic device first.

9. The method of claim 5, wherein the controlling comprises audibly emitting the first audio content into the environment and electronically delivering the second audio content to a companion electronic device.

10. The method of claim 5, wherein the controlling comprises precluding delivery of both the first audio content and the second audio content.

11. The method of claim 5, wherein the controlling comprises electronically delivering the first audio content to a first companion electronic device and also electronically delivering the second audio content to a second companion electronic device.

12. The method of claim 5, wherein the controlling comprises multiplexing the first audio content and the second audio content.

13. The method of claim 1, wherein the geometric form factor comprises a first device housing of the electronic device positioned about a hinge relative to a second device housing to an axially displaced open position with the electronic device coupled to a docking station.

14. An electronic device, comprising:
a first device housing coupled to a second device housing by a hinge such that the first device housing is pivotable about the hinge relative to the second device housing between a closed position and an axially displaced open position;
one or more sensors operable to determine a geometric form factor of the electronic device defined by how far the first device housing is pivoted about the hinge relative to the second device housing;
a first display coupled to the first device housing;
a second display coupled to the first device housing; and
one or more processors operable with the one or more sensors, the first display, and the second display, the one or more processors enabling a dual content presentation mode of operation allowing presentation of first content on the first display and second content on the second display when the one or more sensors detect a predefined geometric form factor.

15. The electronic device of claim 14, further comprising one or more other sensors operable with the one or more processors to detect a number of persons within an environment of the electronic device, the one or more processors further enabling a dual user input control mode of operation allowing user input received at the first display and the second display, respectively, to independently control the first display and the second display when the one or more other sensors detect a plurality of persons within the environment.

16. The electronic device of claim 15, the one or more processors controlling presentation of first audio content associated with the first content and second audio content associated with the second content by acoustically delivering the first audio content to the environment and electronically delivering the second audio content to a companion electronic device.

17. The electronic device of claim 16, the one or more processors controlling the presentation of the first audio content and the second audio content as a function of which person of the plurality of persons is identified by the one or more other sensors as an authorized user of the electronic device.

18. A method in an electronic device, the method comprising:
detecting, with at least a first sensor, a first device housing of the electronic device positioned in an axially displaced open position relative to a second device housing coupled to the first device housing by a hinge;
detecting, with at least a second sensor, the electronic device being electronically coupled to a docking station; and
detecting, with at least a third sensor, multiple persons within an environment of the electronic device while the electronic device is in the axially displaced open position and is coupled to the docking station; and
enabling, with one or more processors in response to detecting the multiple persons within the environment of the electronic device while the electronic device is in the axially displaced open position and is coupled to the docking station, a dual content presentation mode of operation allowing presentation of first content on a first display of the electronic device and second content on a second display where the first content and the second content are different.

19. The method of claim 18, further comprising also enabling, with the one or more processors in response to detecting the multiple persons within the environment of the electronic device while the electronic device is in the axially displaced open position and is coupled to the docking station, a dual user input control mode of operation allowing the first display to be controlled independently of the second display and vice versa.

20. The method of claim 19, further comprising processing first audio content associated with the first content differently than second audio content associated with the second content in response to detecting the multiple persons within the environment of the electronic device while the electronic device is in the axially displaced open position and is coupled to the docking station.

\* \* \* \* \*